United States Patent [19]
Shojo et al.

[11] Patent Number: 5,724,641
[45] Date of Patent: Mar. 3, 1998

[54] IMAGE FORMING APPARATUS COMPRISING A STAPLER RELATIVELY MOVABLE IN THE POSITIONS OF THE ORIGINAL DISCHARGE TRAY AND THE SHEET DISCHARGE TRAYS

[75] Inventors: Yoshihiro Shojo, Itami; Shizuo Yuge; Keichi Kinoshita, both of Toyokawa; Yoshio Sakagawa, Takatsuki, all of Japan

[73] Assignee: Minolta Co., Ltd., Osaka, Japan

[21] Appl. No.: 660,325

[22] Filed: Jun. 4, 1996

[30] Foreign Application Priority Data

Jun. 5, 1995 [JP] Japan ................. 7-162776
Dec. 14, 1995 [JP] Japan ................. 7-348095

[51] Int. Cl.$^6$ ................................. G03G 15/00
[52] U.S. Cl. ................. 399/410; 270/58.08; 270/58.13; 399/38; 399/81; 399/367
[58] Field of Search ................. 399/81, 367, 405, 399/410, 365, 38; 270/58.08, 58.13, 58.14

[56] References Cited

U.S. PATENT DOCUMENTS

| | | | |
|---|---|---|---|
| 4,300,829 | 11/1981 | Braswell et al. | 399/81 |
| 5,221,953 | 6/1993 | Higaki | 399/16 |
| 5,515,150 | 5/1996 | Yoshie et al. | 399/367 |

*Primary Examiner*—Arthur T. Grimley
*Assistant Examiner*—Sophia S. Chen
*Attorney, Agent, or Firm*—McDermott, Will & Emery

[57] ABSTRACT

An image forming apparatus according to the present invention contains an original set tray on which originals are set, image reading system for reading an image on the original, image forming system for forming an image on a sheet on the basis of the image on the original read by the image reading system, an original discharge tray onto which the originals from which the images have been respectively read are discharged, an automatic document feeder for leading the originals set on the original set tray to the position of the image reading system one original at a time, and then discharging the original onto the original discharge tray, a plurality of sheet discharge trays onto which the sheets respectively having the images formed thereon are discharged, distributing system for distributing the sheets respectively having the images formed thereon among the plurality of sheet discharge trays, and a stapler relatively movable in the positions of the original discharge tray and the plurality of sheet discharge trays.

18 Claims, 27 Drawing Sheets

(c) ← (b) ← (a)

(c) ← (b) ← (a)

(a) → (b) → (c)

(a) → (b)

(a) → (b)

(a) → (b) → (c)

(a) → (b) → (c)

IMAGE FORMING APPARATUS COMPRISING A STAPLER RELATIVELY MOVABLE IN THE POSITIONS OF THE ORIGINAL DISCHARGE TRAY AND THE SHEET DISCHARGE TRAYS

BACKGROUND OF THE INVENTION

1. Field of the Invention

The present invention relates to an image forming apparatus comprising an automatic document feeder for automatically feeding originals from an original set tray and discharging the originals, an original discharge tray onto which the originals are discharged by the automatic document feeder, and a sheet discharge tray onto which sheets respectively having images formed thereon are discharged, which is so adapted that the originals can be automatically stapled in addition to the sheets respectively having the images formed thereon.

2. Description of the Prior Art

As an image forming apparatus such as a copying machine, an image forming apparatus comprising an automatic document feeder for automatically feeding originals for image formation from an original set tray and discharging the originals, and a sorter for sorting sheets respectively having images formed thereon and discharging the sheets onto each of a plurality of sheet discharge trays has conventionally existed.

In recent years, an image forming apparatus so adapted as to staple by a stapler a plurality of sheets sorted by the sorter and discharged onto each of the discharge trays as described above has been employed.

In the case of the above-mentioned conventional image forming apparatus provided with the stapler, the stapler is moved in the positions of the plurality of sheet discharge trays onto which the sheets respectively having images formed thereon are discharged, which can only staple the sheets sorted by the sorter and discharged onto each of the sheet discharge trays and cannot staple the originals discharged by the automatic document feeder.

Therefore, the stapler has conventionally stapled the originals discharged onto the original discharge tray by the automatic document feeder after being arranged by a person, besides stapling the sheets respectively having images formed thereon, whose operation is laborious.

SUMMARY OF THE INVENTION

A first object of the present invention is to make it possible for a stapler to automatically staple sheets discharged onto each of sheet discharge trays after images are respectively formed thereon as well as originals discharged by an automatic document feeder.

A second object of the present invention is to make it possible for a stapler to respectively staple, in automatically stapling sheets discharged onto each of sheet discharge trays after images are respectively formed thereon as well as originals discharged by an automatic document feeder as described above, the originals and the sheets respectively having the images formed thereon in the same suitable positions, for example, the upper left positions of image surfaces of the originals and the sheets.

A first image forming apparatus according to the present invention comprises an original set tray on which originals are set, image reading means for reading an image on the original, image forming means for forming an image on a sheet on the basis of the image on the original read by the image reading means, an original discharge tray onto which the originals from which the images have been respectively read are discharged, a plurality of sheet discharge trays onto which the sheets respectively having the images formed thereon are discharged, an automatic document feeder for leading the originals set on the original set tray to the position of the image reading means one original at a time, and then discharging the original onto the original discharge tray, distributing means for distributing the sheets respectively having the images formed thereon among the plurality of sheet discharge trays, and a stapler relatively movable in the positions of the original discharge tray and the plurality of sheet discharge trays.

A second image forming apparatus according to the present invention comprises an original set tray on which originals are set, image reading means for reading an image on the original, image forming means for forming an image on a sheet on the basis of the image on the original read by the image reading means, an original discharge tray onto which the originals from which the images have been respectively read are discharged, a plurality of sheet discharge trays onto which the sheets respectively having the images formed thereon are discharged, an automatic document feeder for leading the originals set on the original set tray to the position of the image reading means one original at a time, and then discharging the original onto any one of the original discharge tray and the sheet discharge trays, switching means for switching the original discharge tray and the sheet discharge trays onto which the originals from which the images have been respectively read are to be discharged, distributing means for distributing the sheets respectively having the images formed thereon among the plurality of sheet discharge trays, and a stapler relatively moved with respect to the plurality of sheet discharge trays.

A third image forming apparatus according to the present invention comprises an original set tray on which originals are set, image reading means for reading an image on the original, image forming means for forming an image on a sheet on the basis of the image on the original read by the image reading means, an original discharge tray onto which the originals from which the images have been respectively read are discharged, a sheet discharge tray onto which the sheets respectively having the images formed thereon are discharged, an automatic document feeder for leading the originals set on the original set tray to the position of the image reading means one original at a time, and then discharging the original onto either one of the original discharge tray and the sheet discharge tray, switching means for switching the original discharge tray and the sheet discharge tray onto which the originals from which the images have been respectively read are to be discharged, and a stapler for respectively stapling the originals discharged onto the sheet discharge tray and the sheets respectively having the images formed thereon.

In the above-mentioned first to third image forming apparatuses, the sheets discharged onto the sheet discharge tray after the images have been respectively formed thereon as well as the originals discharged by the automatic document feeder are automatically stapled by the stapler, respectively.

When the originals discharged onto the original discharge tray or the sheet discharge tray as well as the sheets discharged onto the other sheet discharge tray are so discharged that the images on the originals and the images formed on the sheets are in the same direction, the originals and the sheets respectively having the images formed thereon are respectively stapled in the same positions by the stapler.

Furthermore, by providing the original discharge tray and the sheet discharge tray in the suitable positions, the originals and the sheets respectively having the images formed thereon are respectively stapled in the same suitable positions by the stapler.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
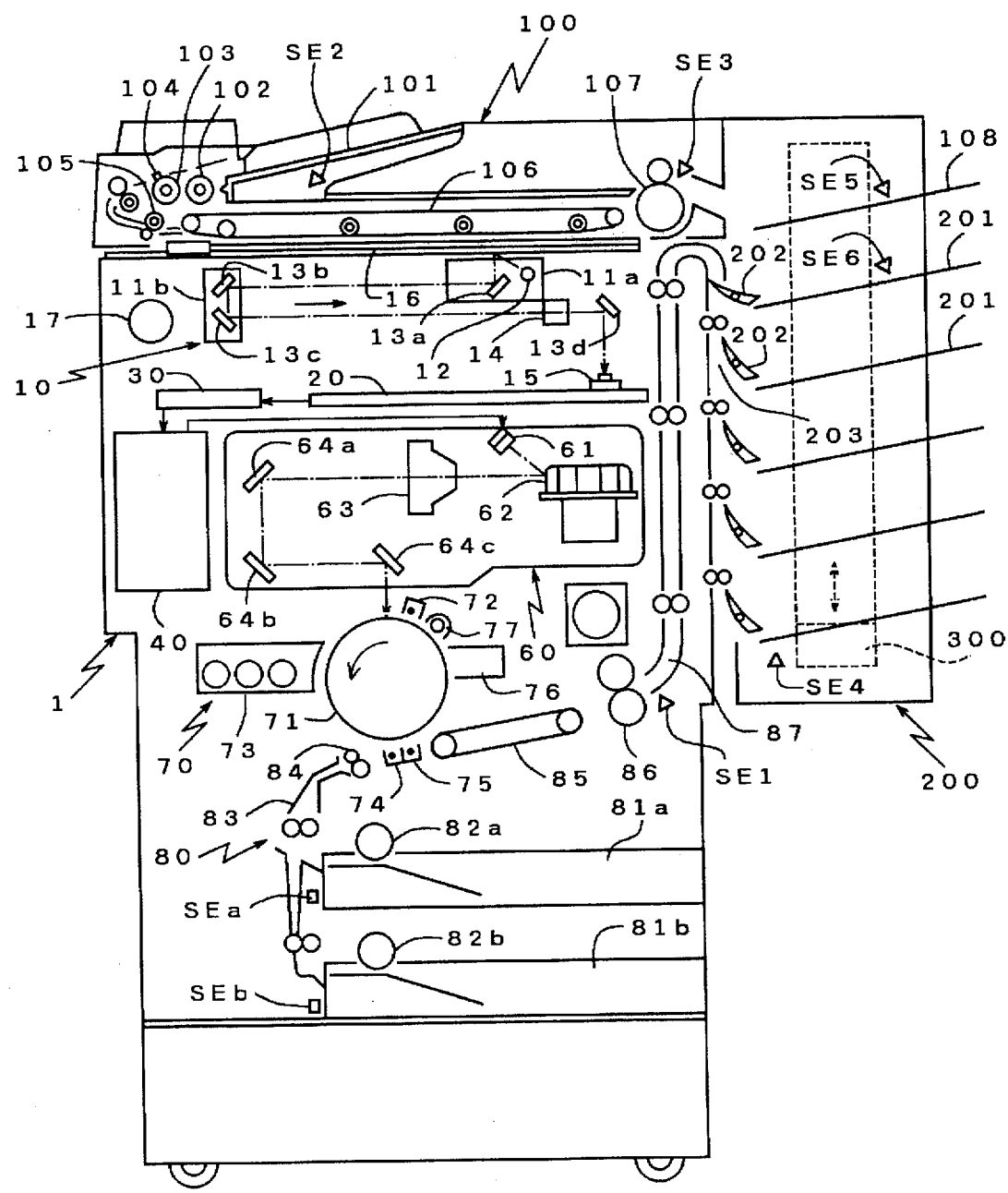
FIG. 1 is a schematic illustration of an image forming apparatus according to an embodiment 1 of the present invention.

Image forming apparatuses according to embodiments of the present invention will be specifically described on the basis of attached drawings.

(Embodiment 1)

An image forming apparatus according to the present embodiment comprises in a main body 1 of the apparatus a reading system 10 for reading an image on an original and converting the image into image data, an image data processing unit 20 for processing the image data transmitted from the reading system 10, a memory unit 30 for switching an operation of outputting the image data transmitted from the image data processing unit 20 as it is as printing data to an image formation processing unit 40 and an operation of storing the image data in a memory once, the image formation processing unit 40 for driving an optical system 60 on the basis of the printing data transmitted from the memory unit 30, the optical system 60 for scanning laser beams emitted from a semiconductor laser 61 on a photosensitive drum 71, an image forming system 70 for developing a latent image formed on the photosensitive drum 71, and sheet conveying means 80.

The reading system 10 comprises an exposure lamp 12 and a first mirror 13a mounted on a first scanner 11a, second and third mirrors 13b and 13c mounted on a second scanner 11b, an image forming lens 14, a fourth mirror 13d, a line sensor 15 composed of a CCD, and a motor 17.

Each of the scanners 11a and 11b is driven by the motor 17, to move in the subscanning direction directly below a platen glass 16. With the movement, an image on an original set on the platen glass 16 is read by the line sensor 15. The line sensor 15 has a number of devices (CCDs) arranged in the main scanning direction perpendicular to the subscanning direction.

The image formation processing unit 40 drives the optical system 60 one line at a time in the main scanning direction on the basis of printing data.

The optical system 60 comprises the semiconductor laser 61 which is subjected to on/off control by the image formation processing unit 40, a polygon mirror 62 for polarizing and scanning the laser beams emitted from the semiconductor laser 61, an fθ lens 63 for correcting distortion aberration or the like of the polarized laser beams, and mirrors 64a, 64b, and 64c for leading the laser beams onto the photosensitive drum 71.

The image forming system 70 is constructed by arranging around the photosensitive drum 71 driven to rotate along the direction of rotation thereof a charging corona discharger 72, a developing device 73, a transferring corona discharger 74, a separating corona discharger 75, a cleaner 76 for removing toner remaining on the photosensitive drum 71, and an eraser lamp 77 for erasing charges remaining on the photosensitive drum 71.

The sheet conveying means 80 comprises automatic sheet feeding cassettes 81a and 81b containing sheets, sheet feeding rollers 82a and 82b for feeding the sheets one at a time, a sheet feeding path 83, a timing roller 84, a conveying belt 85, a toner fixing device 86, and a conveying path 87. The sheet conveying means 80 and the above-mentioned photosensitive drum 71 are driven by a main motor (not shown).

Sensors SEa and SEb for detecting the sheet size are respectively provided in the vicinity of the sheet feeding cassettes 81a and 81b, and a sensor SE1 for detecting the passage of the sheet is provided in a suitable position of the conveying path 87.

In the image forming apparatus, an automatic document feeder (ADF) 100 is provided on the main body 1 of the apparatus.

The automatic document feeder 100 comprises a pickup roller 102, a sort roller 103 and a sort pad 104, a register roller 105, a conveying belt 106, and a reversing roller 107.

In the automatic document feeder 100, originals set on an original set tray 101 are fed in the order from the lowermost original by the pickup roller 102, the sort roller 103 and the sort pad 104, the fed original is fed to the platen glass 16 in a state where it is so turned over that its image surface is directed downward by the register roller 105 and the conveying belt 106, and an image on the original is read by the reading system 10. Thereafter, the original is fed to the reversing roller 107 by the conveying belt 106, is turned over by the reversing roller 107, and is discharged onto the original set tray 101 with the image surface directed upward.

In the automatic document feeder 100, there are provided a sensor SE2 for sensing the presence or absence of an original on the original set tray 101, and a sensor SE3 for sensing the trailing edge of the original turned over by the reversing roller 107.

On the other hand, when image data of the original is read by the reading system 10 as described above, the image data is converted into printing data by the image data processing unit 20, the printing data is transmitted to the image formation processing unit 40 via the memory unit 30, and the optical system 60 is driven by the image formation processing unit 40 to form a latent image on the photosensitive drum 71 charged by the charging corona discharger 72.

Toner is supplied to the photosensitive drum 71 having the latent image thus formed thereon from the developer 73, and a toner image formed on the photosensitive drum 71 is transferred to a sheet conveyed by the sheet conveying means 80 by the transferring corona discharger 74. Thereafter, the sheet having the toner image transferred thereto is separated from the photosensitive drum 71 by the separating corona discharger 75, and the sheet is led to the toner fixing device 86, where the transferred toner image is fixed to the sheet. On the other hand, toner or the like remaining on the photosensitive drum 71 after the transfer is removed by the cleaner 76, and remaining charges on the photosensitive drum 71 are further erased by the eraser lamp 77.

In the image forming apparatus, a sorter 200 for sorting sheets respectively having images formed thereon in the above-mentioned manner is provided in a portion onto which the sheets are discharged.

The sorter 200 is provided with sheet discharge trays (bins) 201 in a plurality of stages onto which the sheets respectively having the images formed thereon are discharged, guide claws 202 rotated by a solenoid (not shown) so as to correspond to the sheet discharge trays 201, and a guide path 203 for leading the sheets respectively having the images formed thereon to the sheet discharge tray 201 in the lowermost stage.

A sensor SE4 for sensing that the sheet is discharged onto the sheet discharge tray 201 is provided in the lower part of the sorter 200.

A stapler 300 moved up and down by a pulse motor (not shown) is provided in the positions of an original discharge tray 108 and the sheet discharge trays 201 in a plurality of stages onto which the sheets are discharged. A sensor SE5 for sensing that the stapler 300 exists in the position of the original discharge tray 108 is provided in the vicinity of the original discharge tray 108, and a sensor SE6 for sensing that the stapler 300 exists in the position of the sheet discharge tray 201 in the uppermost stage is provided in the vicinity of the sheet discharge tray 201 positioned in the uppermost stage.

Figure 2:
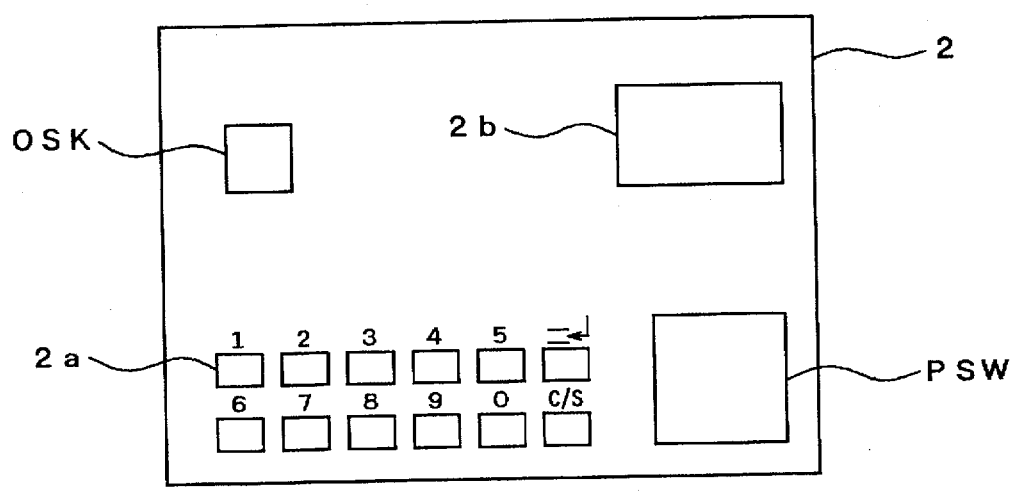
FIG. 2 is a diagram showing an operation panel in the image forming apparatus according to the embodiment 1.

An operation panel 2 is provided, as shown in FIG. 2, in the main body 1 of the image forming apparatus. The operation panel 2 is provided with a ten-key 2a for entering the number of copies, a print switch PSW for starting printing, a selection key OSK for making a selection as to whether or not originals are to be stapled, and a display 2b for displaying the entered number of copies or the like. The originals are stapled when the selection key OSK is turned on, while the originals are not stapled when it is turned off.

Figure 3:
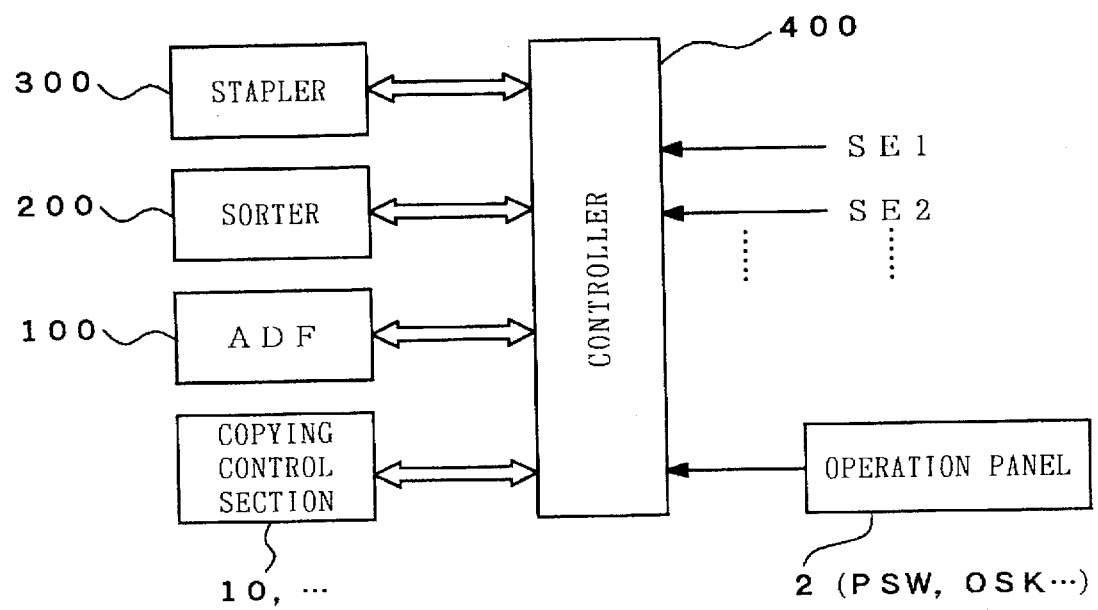
FIG. 3 is a block diagram showing a control circuit in the image forming apparatus according to the embodiment 1.

A control circuit in the image forming apparatus is constructed by connecting to a controller 400 the above-mentioned sensors SE1, SE2, ..., the operation panel 2 comprising the print switch PSW, the selection key OSK, and the like, the automatic document feeder (ADF) 100, the sorter 200, the stapler 300, and a copying control section such as the reading system 10, as shown in FIG. 3. The controller 400 comprises a CPU, a RAM, a ROM storing a program for controlling a copying operation, for example, and the like.

Control operations of the image forming apparatus according to the present embodiment will be described with reference to respective flow charts. In each of the flow charts, on-edge means that each of the switches, the sensors, and the like is switched from its off state to its on state, and off-edge means that each of the switches, the sensors, and the like is switched from its on state to its off state.

Figure 4:
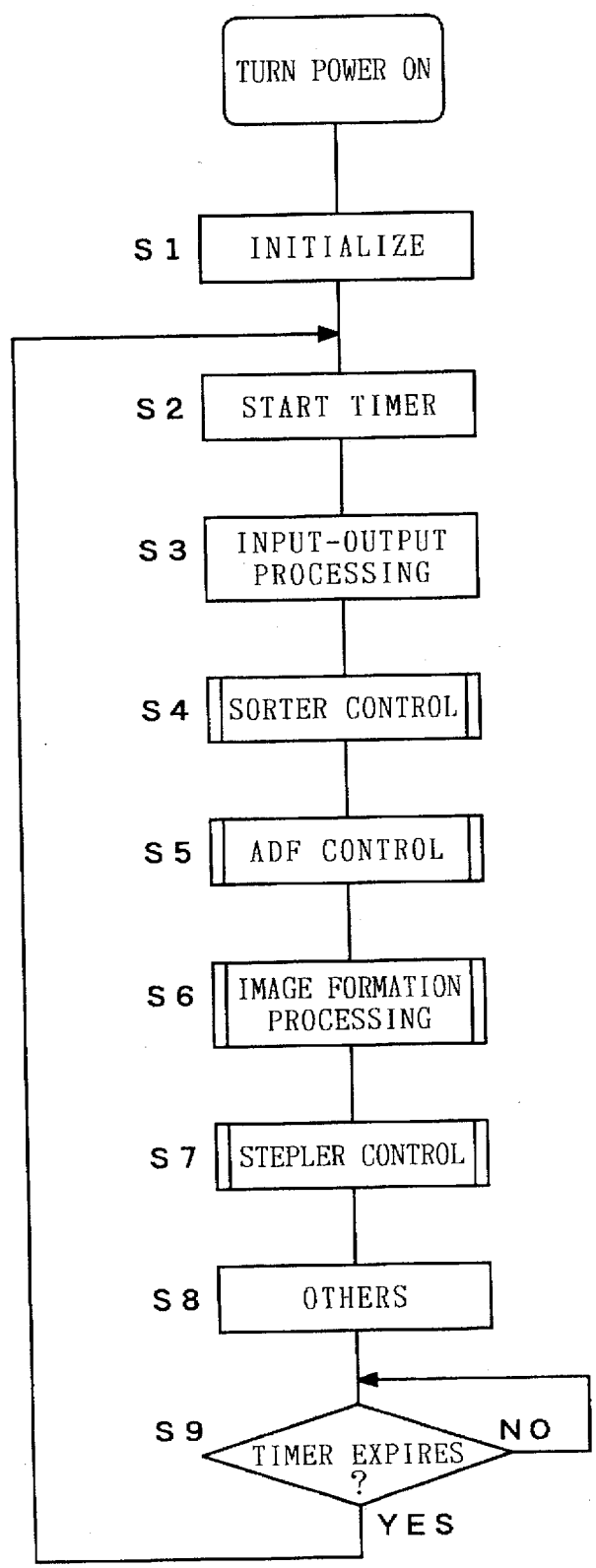
FIG. 4 is a flow chart showing a main routine of the control circuit in the image forming apparatus according to the embodiment 1.

FIG. 4 shows a main routine of the control circuit in the image forming apparatus. When the power supply is turned on, the respective units are first initialized at the step S1, and an internal timer is then started at the step S2. The internal timer determines predetermined time of the main routine, whose value is previously set in the initialization at the step S1.

At the step S3, the controller 400 then performs predetermined input-output processing on the basis of required information such as the number of copies X entered by the ten-key 2a and the like on the operation panel 2, stapler control, and start of copying.

Required processing is performed by calling respective subroutines of sorter control at the step S4, ADF control at the step S5, image formation processing at the step S6, and stapler control at the step S7, and the other processing is further performed as required at the step S8, after which the program is returned to the step S2 upon expiration of the internal timer at the step S9. Various timers in each of the subroutines are counted using the length of time of one routine.

Figure 5:
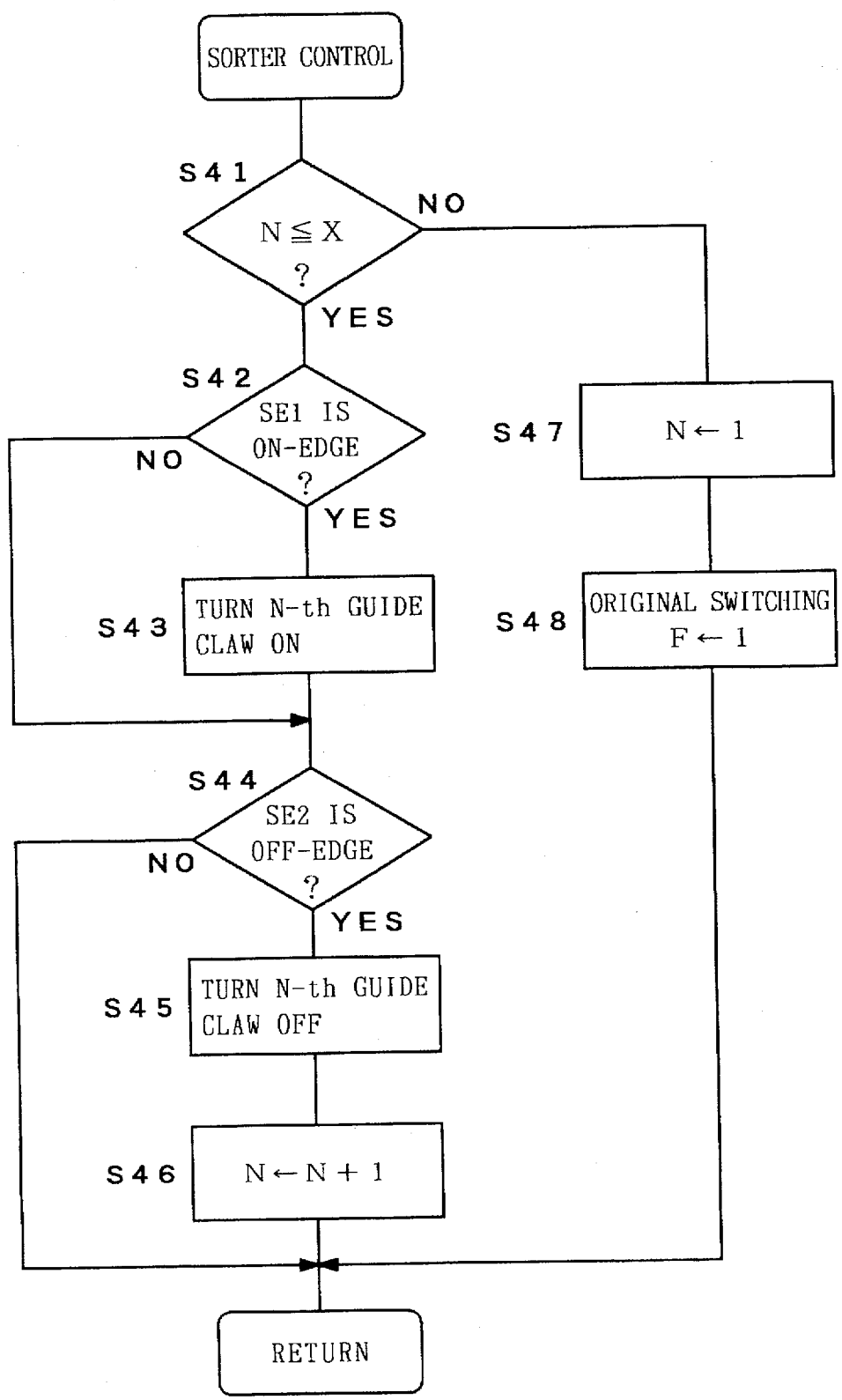
FIG. 5 is a flow chart showing a subroutine of sorter control in the main routine shown in FIG. 4.

The sorter control at the foregoing step S4 proceeds in accordance with a subroutine shown in FIG. 5.

When the subroutine of the sorter control is started, the number of times of sorting N and the number of copies X are first compared with each other at the step S41. When the number of times of sorting N does not exceed the number of copies X, the program proceeds to the step S42.

At the step S42, when the sensor SE1 provided on the conveying path 87 detects the leading edge of a sheet having an image formed thereon, the program proceeds to the step S43.

At the step S43, the guide claw 202 in the N-th stage provided for the bin 201 in the N-th stage corresponding to the number of times of sorting N is rotated by the solenoid and is turned on, and the guide claw 202 is inclined toward the guide path 203, to lead the sheet having the image formed thereon to the bin 201 in the N-th stage, after which the program proceeds to the step S44. On the other hand, when the sensor SE1 does not detect the leading edge of the sheet having the image formed thereon at the step S43, the program directly proceeds to the step S44.

When the sheet is led to the bin 201 in the N-th stage, and the sensor SE4 provided in the lower part of the sorter 200 detects the trailing edge of the sheet at the step S44, the program proceeds to the step S45. At the step S45, the guide claw 202 in the N-th stage which is in its on state is turned off and is returned to the original state, after which the program proceeds to the step S46. At the step S46, the value of the number of times of sorting N is increased by one, and a value obtained is taken as N, after which the program is returned to the main routine. When the sensor SE4 does not detect the trailing edge of the sheet at the foregoing step S44, the program is directly returned to the main routine.

Figure 6:
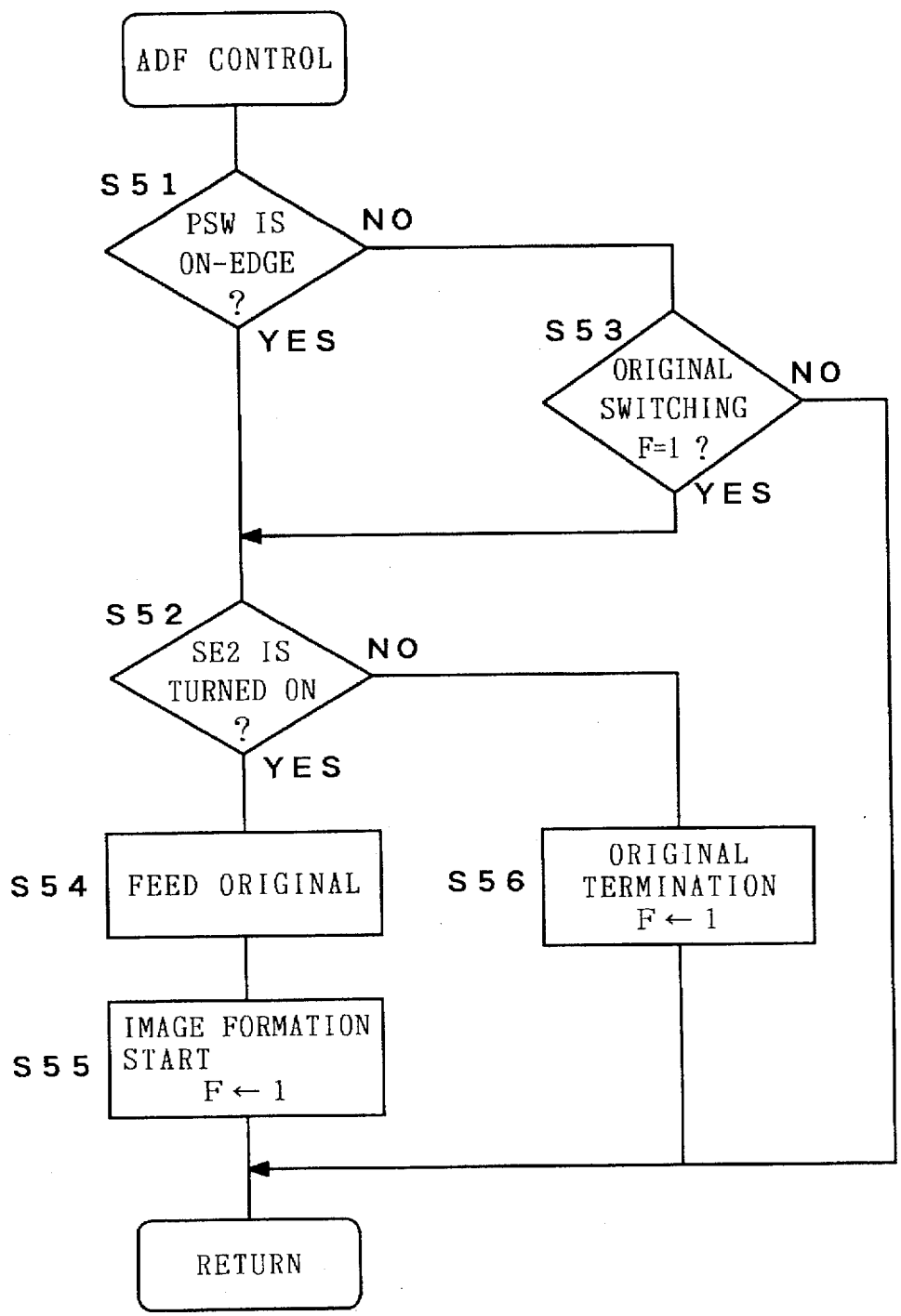
FIG. 6 is a flow chart showing a subroutine of ADF control in the main routine shown in FIG. 4.

A copying operation is repeated while switching the bin 201 in the sorter 200 until the number of times of sorting N reaches the set number of copies X. If the number of times of sorting N exceeds the number of copies X at the step S41, the program proceeds to the step S47. At the step S47, the value of N is returned to one, after which the program proceeds to the subsequent step S48. At the step S48, an original switching flag for the ADF control is set to one, after which the program is returned to the main routine. The ADF control at the step S5 in the above-mentioned main routine proceeds in accordance with a subroutine shown in FIG. 6.

When the ADF control is started, it is first determined at the step S51 whether or not the print switch PSW is depressed. When the print switch PSW is on-edge, the program proceeds to the step S52. On the other hand, when the print switch PSW is not on-edge, the program proceeds to the step S53. At the step S53, it is judged whether or not the original switching flag instructing the switching of originals is one. If the original switching flag is one, the program proceeds to the step S52, as in the above-mentioned case where the print switch PSW is on-edge. On the other hand, if the original switching flag is not one, the program is directly returned to the main routine.

At the step S52, the presence or absence of an original on the original set tray 101 is then detected by the sensor SE2. If the original exists on the original set tray 101, the program proceeds to the step S54. At the step S54, the original on the original set tray 101 is fed, after which the program proceeds to the step S55. At the step S55, an image formation start flag instructing the start of image formation is set to one, after which the program is returned to the main routine.

On the other hand, when there remain no original on the original set tray 101 as a result of successively feeding the originals on the original set tray 101, and the original on the original set tray 101 is not sensed by the sensor SE2 at the foregoing step S52, the program proceeds to the step S56. At the step S56, an original termination flag indicating that the feeding of originals is terminated is set to one, after which the program is returned to the main routine.

Figure 7:
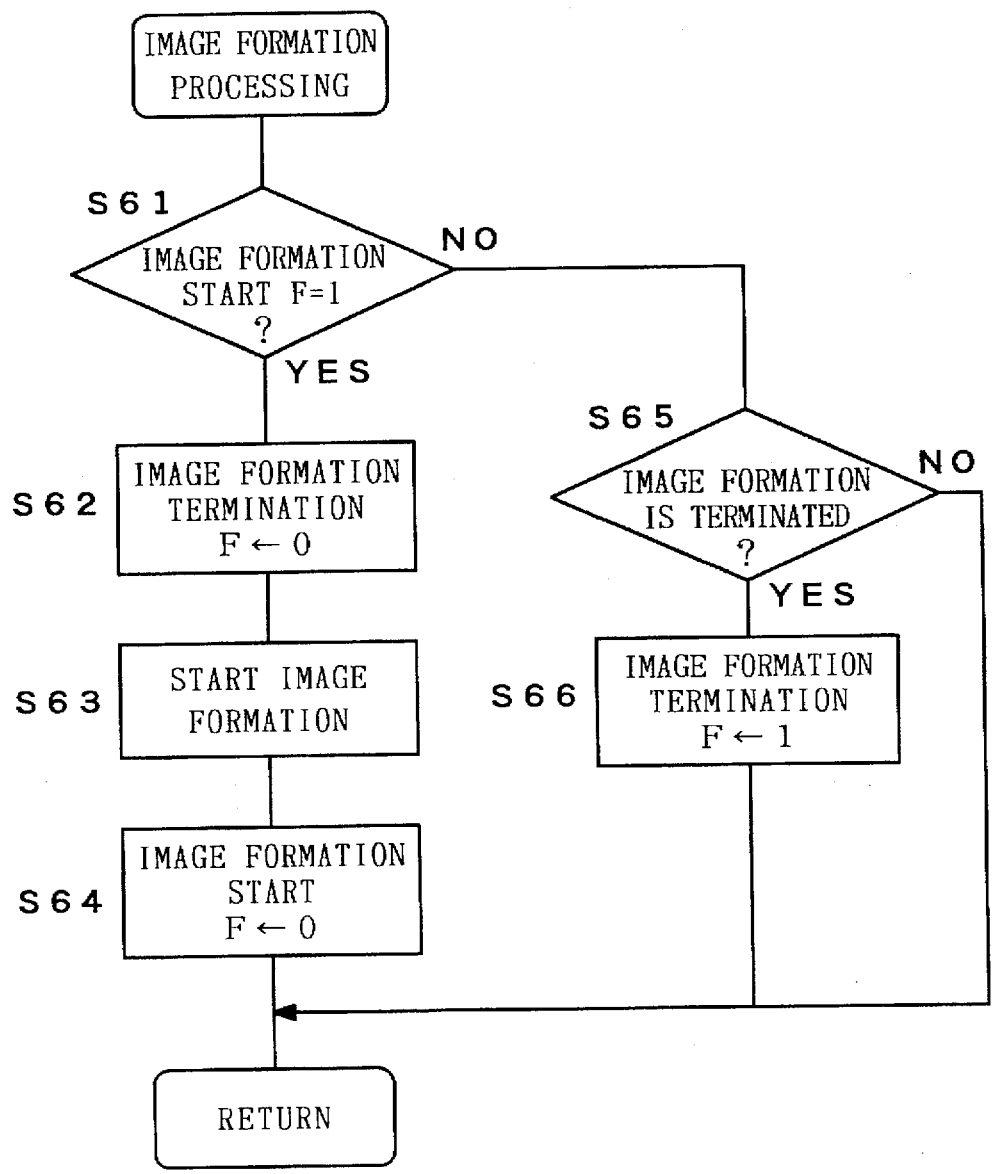
FIG. 7 is a flow chart showing a subroutine of image formation processing in the main routine shown in FIG. 4.

The image formation processing at the step S6 in the above-mentioned main routine proceeds in accordance with a subroutine shown in FIG. 7.

When the image formation processing is started, it is first judged at the step S61 whether or not the image formation start flag is one. If the image formation start flag is one, the program proceeds to the step S62.

At the step S62, an image formation termination flag is so set to zero as to allow image formation, after which the program proceeds to the step S63. At the step S63, the image formation is started. An image is formed on a sheet as described above, after which the program proceeds to the step S64. At the step S64, the image formation start flag is set to zero, after which the program is returned to the main routine.

On the other hand, if the image formation start flag is not one at the foregoing step S61, the program proceeds to the step S65. At the step S65, it is judged whether or not the image formation is terminated. If the image formation is terminated, the program proceeds to the step S66. At the step S66, the image formation termination flag indicating that image formation is terminated is set to one, after which the program is returned to the main routine. If the image formation is not terminated at the forgoing step S65, the program is directly returned to the main routine.

Figure 8:
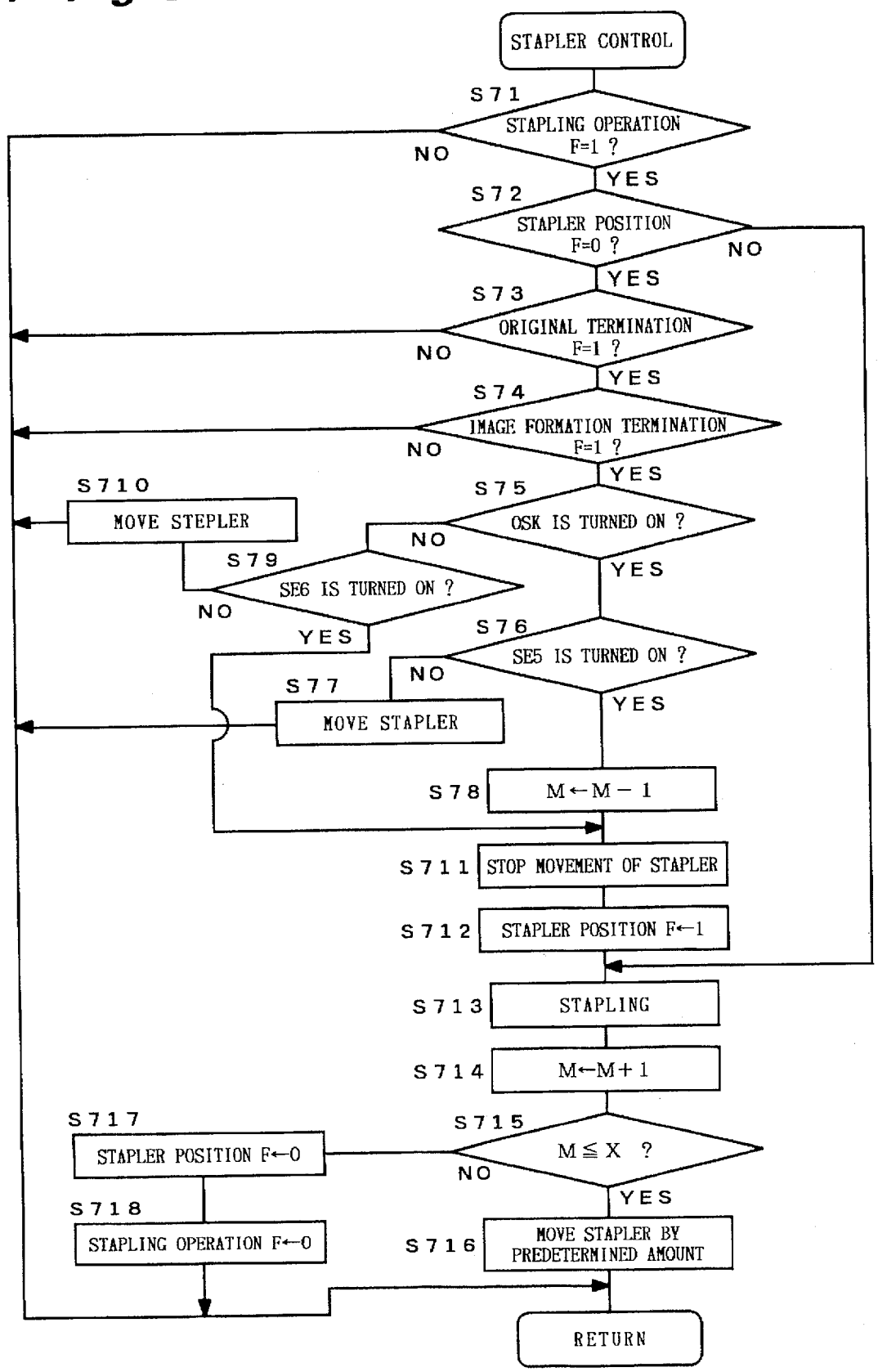
FIG. 8 is a flow chart showing a subroutine of stapler control in the main routine shown in FIG. 4.
Figure 9:
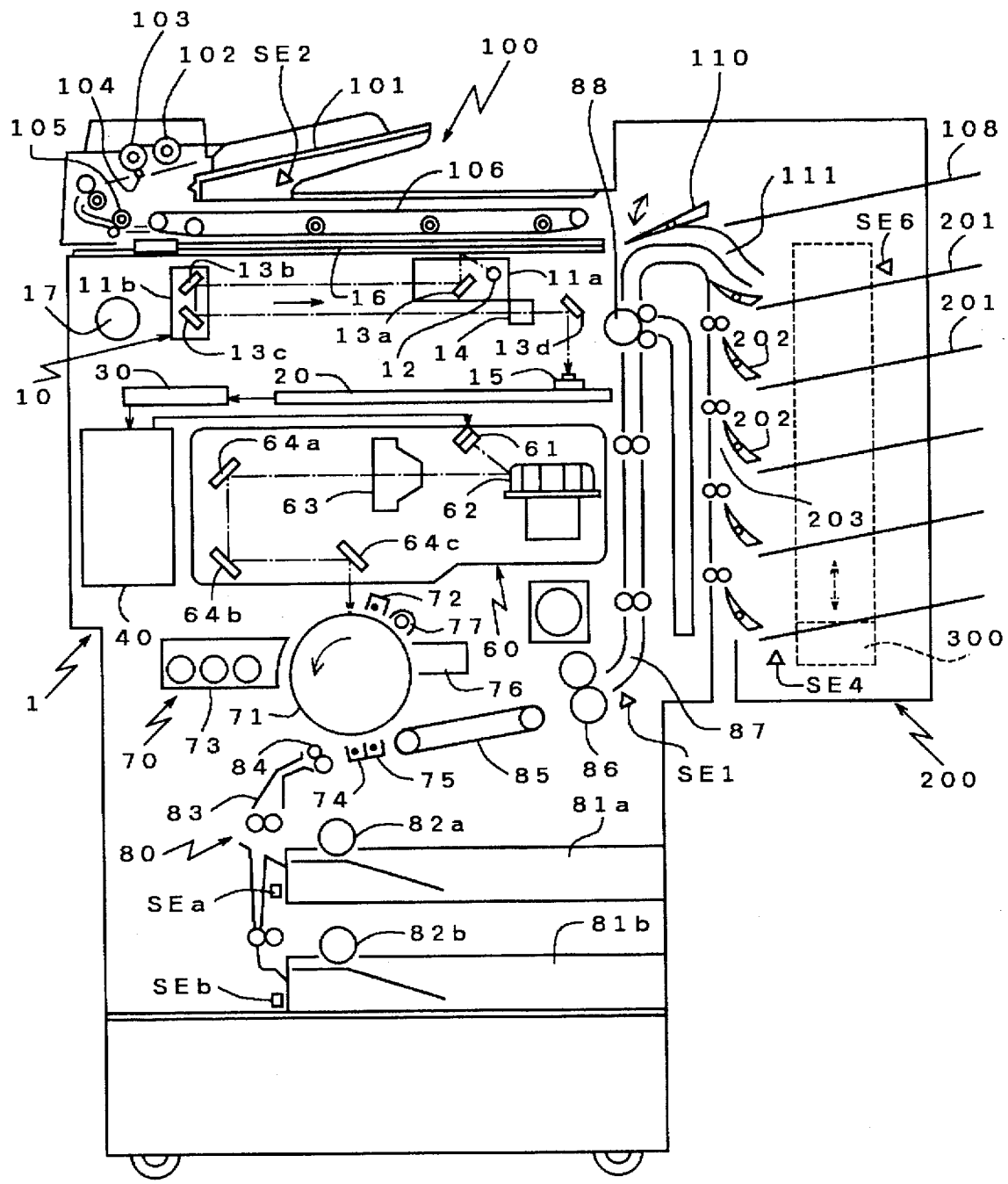
FIG. 9 is a schematic illustration of an image forming apparatus according to an embodiment 2 of the present invention.

The stapler control at the step S7 in the above-mentioned main routine proceeds in accordance with a subroutine shown in FIG. 8.

When the stapler control is started, it is first judged at the step S71 whether or not a stapling operation flag instructing a stapling operation by the input-output processing at the foregoing step S3 is set to one. The program proceeds to the subsequent step S72 if the stapling operation flag is one, while being returned to the main routine if the stapling operation flag is not one.

At the step S72, it is judged whether or not a stapler position flag is zero. When the positioning of the stapler 300 is not terminated, so that the stapler position flag is zero, the program proceeds to the step S73. On the other hand, if the stapler position flag is not zero upon termination of the positioning of the stapler 300, the program proceeds to the step S713 as described later.

At the step S73, it is judged whether or not the original termination flag is one. The program proceeds to the subsequent step S74 if the original termination flag is one upon termination of the feeding of the originals on the original set tray 101, while being returned to the main routine if the original termination flag is not one.

At the step S74, it is judged whether or not the image formation termination flag is one. The program proceeds to the subsequent step S75 when the image formation termination flag is one upon termination of the image formation, while being returned to the main routine when the image formation is not terminated.

At the step S75, it is determined whether or not the selection key OSK for making a selection as to whether or not originals are to be stapled is turned on. When the selection key OSK is turned on, to staple the originals discharged onto the original discharge tray 108 in addition to sheets respectively having images formed thereon, the program proceeds to the step S76.

At the step S76, it is determined whether or not the sensor SE5 is turned on upon arrival of the stapler 300 at the position of the original discharge tray 108. When the sensor SE5 is not turned on, the program proceeds to the step S77. At the step S77, the stapler 300 is moved by the pulse motor, after which the program is returned to the main routine. When the stapler 300 is moved as described above, and the sensor SE5 is turned on at the foregoing step S76, the program proceeds to the step S78. At the step S78, the value of the number of times of stapling M is decreased by one, and a value obtained is taken as M. The number of times of stapling M is started at zero, after which the program proceeds to the step S711.

On the other hand, when at the foregoing step S75, the selection key OSK for making a selection as to whether or not originals are to be stapled is not turned on, the program proceeds to the step S79. At the step S79, it is determined whether or not the sensor SE6 is turned on upon arrival of the stapler 300 at the position of the bin 201 positioned in the uppermost stage. When the sensor SE6 is not turned on, the program proceeds to the step S710. At the step S710, the stapler 300 is moved by the pulse motor, after which the program is returned to the main routine. When the stapler 300 is moved, and the sensor SE6 is turned on at the foregoing step S79, the program proceeds to the step S711 on skipping the step S78.

At the step S711, the movement of the stapler 300 is stopped upon stop of the driving of the pulse motor, after which the program proceeds to the subsequent step S712. At the step S712, a stapler position flag indicating that the positioning of the stapler 300 is terminated is set to one, after which the program proceeds to the step S713.

At the step S713, the stapling is performed, after which the program proceeds to the subsequent step S714. At the step S714, the value of the number of times of stapling M is increased by one, and a value obtained is taken as M, after which the program proceeds to the step S715.

At the step S715, the number of times of stapling M and the number of copies X are compared with each other. When the number of times of stapling M does not exceed the number of copies X, the program proceeds to the step S716. At the step S716, the stapler 300 is moved by a predetermined amount upon driving of the pulse motor by a predetermined number of pulses, after which the program is returned to the main routine.

In the subsequent stapler control carried out after the program is returned to the main routine, it is judged at the foregoing step S72 that the stapler position flag is not zero because the stapler position flag is set to one at the step S712. The program proceeds to the step S713 from the step S72. At the step S713, the stapling is performed, after which such operations are repeated. When the number of times of stapling M exceeds the number of copies X at the foregoing step S715, the program proceeds to the step S717. At the step S717, the stapler position flag indicating that the positioning of the stapler 300 is terminated is returned to zero, after which the program proceeds to the step S718. At the step S718, the stapling operation flag is set to zero, to terminate the stapling operation, after which the program is returned to the main routine.

When the stapling operation flag becomes zero in the other processing at the step S8 in the above-mentioned main routine, a series of copying operations including the stapling is terminated, after which the program waits in the state where the units are initialized at the step S1 in the main routine.

In the image forming apparatus according to the present embodiment, by the above-mentioned control, the sheets discharged onto each of the sheet discharge trays 201 are automatically stapled by the stapler 300, and the originals discharged onto the original discharge tray 108 are also automatically stapled by the stapler 300, similarly to the sheets discharged onto each of the sheet discharge trays 201, when the selection key OSK is turned on so as to staple the originals.

(Embodiment 2)

An image forming apparatus according to the present embodiment is similar in basic construction to the image forming apparatus according to the embodiment 1 shown in FIG. 1 and hence, description is mainly made of different points from those in the image forming apparatus according to the embodiment 1.

In the image forming apparatus according to the present embodiment, in automatically feeding originals set on an original set tray 101 by an automatic document feeder 100, the originals set on the original set tray 101 are fed in the order from the uppermost original by a pickup roller 102, a sort roller 103 and a sort pad 104. The fed original is fed onto a platen glass 16 in a state where it is so turned over that its image surface is directed downward by a register roller 105 and a conveying belt 106, and an image on the original is read by a reading system 10.

Thereafter, in conveying the original by the conveying belt 106 and discharging the original, the image forming apparatus according to the present embodiment is provided with a switching member 110 rotated depending on whether it is turned on or off by a solenoid (not shown) in a position short of a position where the original is led to an original discharge tray 108. Determination whether the switching member 101 is turned or off by the solenoid is made in accordance with a selection key OSK provided on an operation panel 2 for making a selection as to whether or not originals are to be stapled. The switching member 110 is turned on when the selection key OSK is turned on, while being turned off when the selection key OSK is not turned on.

In a state where the switching member 110 is turned off, the original is discharged onto the original discharge tray 108 with its image surface directed downward. On the other hand, in a state where the switching member 110 is turned on, the original is led to a sorter 200 via a path 111 and is discharged with its image surface directed downward onto a first sheet discharge tray (bin) 201 positioned in the uppermost stage.

In the image forming apparatus according to the present embodiment, a reversing mechanism 88 is provided in a halfway portion of a conveying path 87 for conveying a sheet having an image formed thereon to the sorter 200 in the above-mentioned sheet conveying means 80, and the sheet conveyed on the conveying path 87 is turned over by the reversing mechanism 88. The sheet is fed into the sorter 200 in a state where it is turned over.

The sheet having the image formed thereon is led to the sheet discharge tray 201 in a suitable position in the sorter 200, and is discharged with its image surface directed downward, similarly to the original, onto the sheet discharge tray 201. When the original is discharged onto the first sheet discharge tray 201 positioned in the uppermost stage in the sorter 200 upon turning-on of the switching member 110 as described above, the sheet having the image formed thereon is discharged successively onto the discharge tray 201 positioned in the second stage from the top to the sheet discharge tray 201 positioned thereunder.

In the image forming apparatus according to the present embodiment, a stapler 300 moved up and down by a motor (not shown) is so provided as to be moved only in the positions of the sheet discharge trays 201 in the sorter 200, and a sensor SE6 for sensing that the stapler 300 exists in the position of the sheet discharge tray 201 positioned in the uppermost stage is provided in the vicinity of the sheet discharge tray 201 positioned in the uppermost stage.

Control operations of the image forming apparatus according to the present embodiment will be described with reference to respective flow charts.

Figure 10:
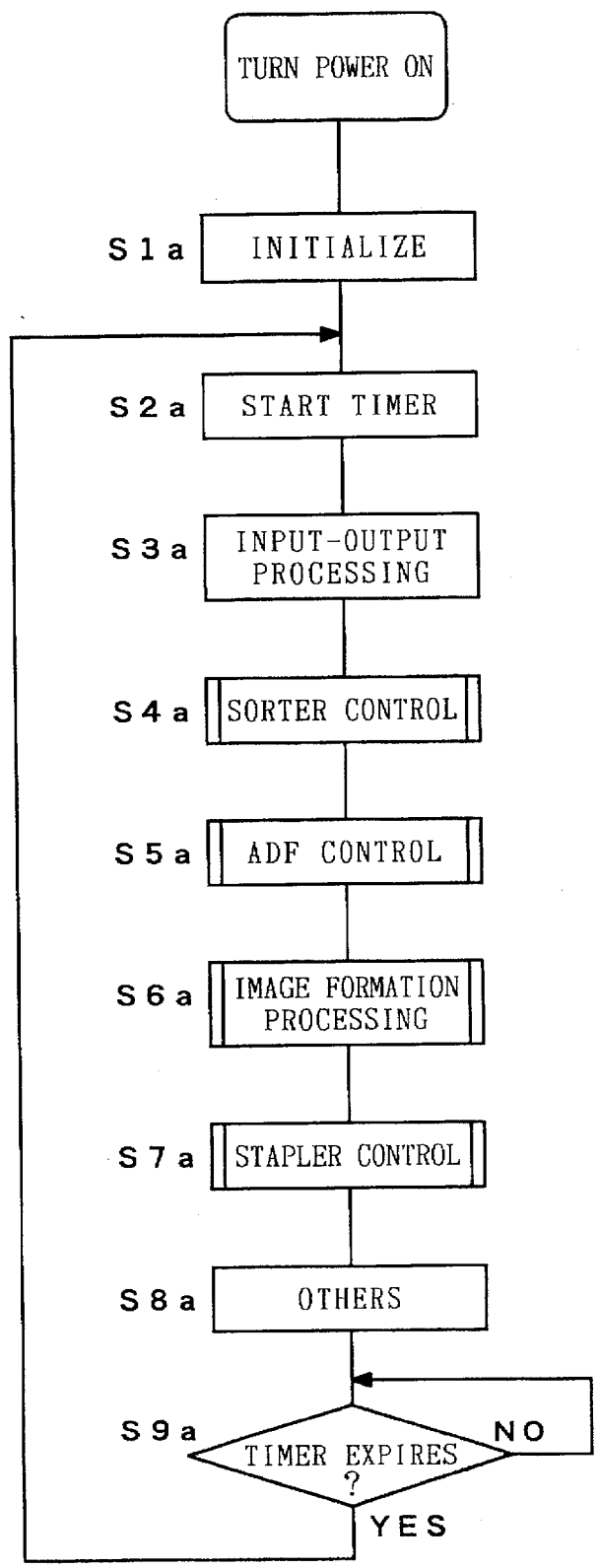
FIG. 10 is a flow chart showing a main routine of a control circuit in the image forming apparatus according to the embodiment 2.

A main routine of a control circuit in the image forming apparatus according to the present embodiment is the same as the main routine of the control circuit in the image forming apparatus according to the embodiment 1 shown in FIG. 4, as shown in FIG. 10. When the power supply is turned on, the respective units are initialized at the step S1a, an internal timer is started at the step S2a, and a controller 400 performs predetermined input-output processing on the basis of required information such as the number of copies X entered from a ten-key 2a on the operation panel 2 by a user at the step S3a, stapler control and start of copying. Required processing is performed by calling respective subroutines of sorter control at the step S4a, ADF control at the step S5a, image formation processing at the step S6a, and stapler control at the step S7a, and the other processing is further performed as required at the step S8a, after which the program is returned to the step S2a upon expiration of the internal timer at the step S9a.

Figure 11:
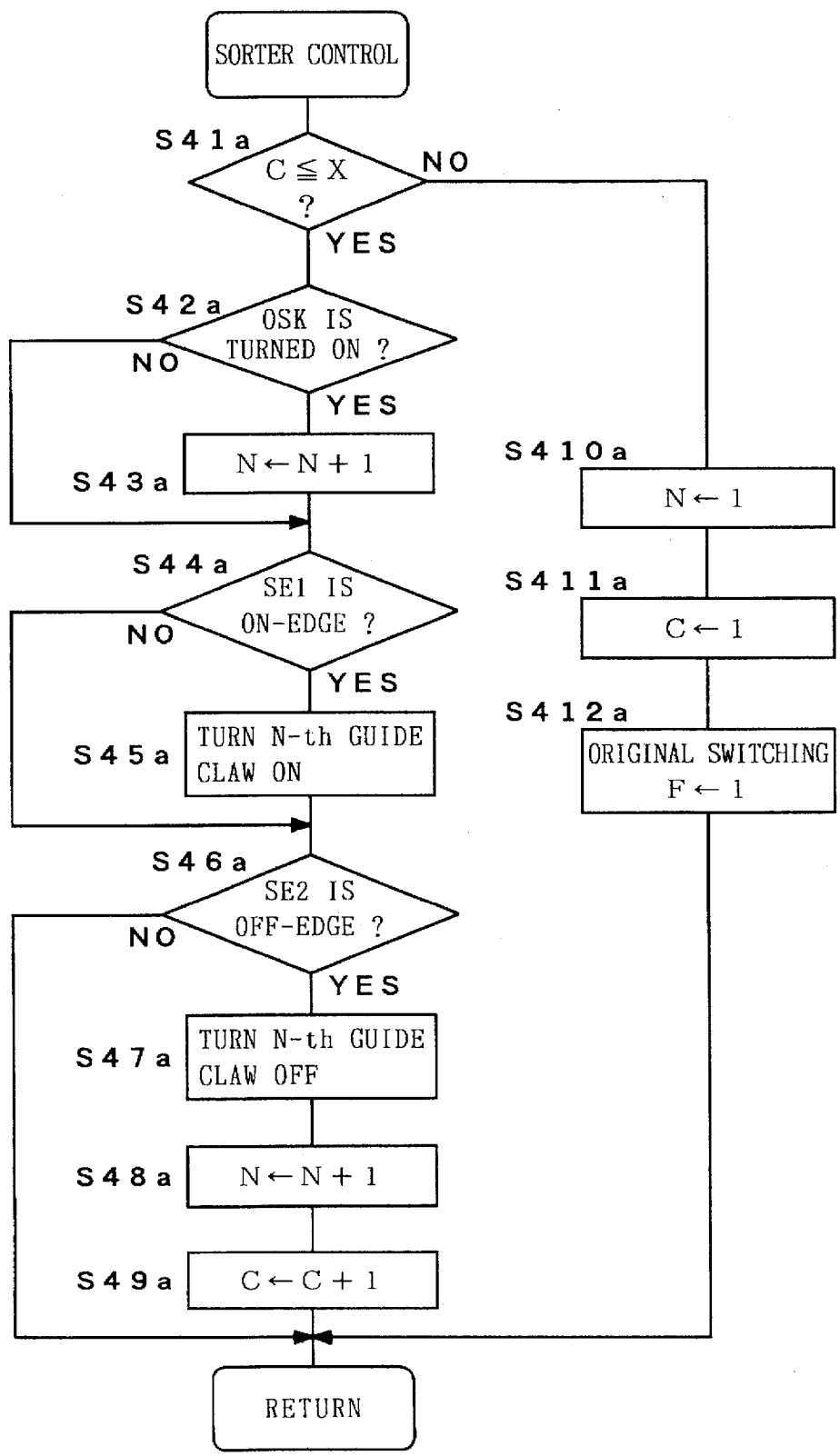
FIG. 11 is a flow chart showing a subroutine of sorter control in the main routine shown in FIG. 10.

The sorter control at the foregoing step S4a proceeds in accordance with a subroutine shown in FIG. 11.

When the subroutine of the sorter control is started, the number of times of sorting C and the number of copies X are first compared with each other at the step S41a. When the number of times of sorting C does not exceed the number of copies X, the program proceeds to the step S42a.

At the step S42a, it is determined whether or not the selection key OSK for making a selection as to whether or not originals are to be stapled is turned on. When the selection key OSK is turned on, to staple the originals, the program proceeds to the step S43a. When the selection key OSK is turned on, to staple the originals, the originals are discharged onto the first bin 201 positioned in the uppermost stage, as will be described in the ADF control later. Therefore, at the step S43a, the value of the number of bins N used for sorting is increased by one, and a value obtained is taken as N, after which the program proceeds to the subsequent step S44a. On the other hand, when the selection key OSK is not turned on, not to staple the originals at the step S42a, the originals are discharged onto not the first bin 201 but the original discharge tray 108, whereby the program directly proceeds to the step S44a.

When a sensor SE1 provided on the conveying path 87 detects the leading edge of a sheet having an image formed thereon at the step S44a, the program proceeds to the step S45a. At the step 45a, a guide claw 202 in the N-th stage provided in a portion of the bin 201 in the N-th stage corresponding to the number of bins N is rotated by the solenoid and is turned on, and the guide claw 202 is inclined toward a guide path 203, to lead the sheet having the image formed thereon to the bin 201 in the N-th stage, after which the program proceeds to the step S46a. On the other hand, when the sensor SE1 does not detect the leading edge of the sheet having the image formed thereon at the step S44a, the program directly proceeds to the step S46a. When the selection key OSK is turned on, to staple the originals, the value of N is previously increased by one as described above. Therefore, the sheet is actually discharged from the bin 201 positioned in the second stage from the top, whereby the bin 201 directly under the bin used in the case where the selection key OSK is not turned on is used.

When the sheet is led to the bin 201 in the N-th stage, and a sensor SE4 provided in the lower part of the sorter 200 detects the trailing edge of the sheet at the step S46a, the program proceeds to the step S47a. At the step S47a, the guide claw 202 in the N-th stage which is in its on state is turned off and is returned to the original state, after which the program proceeds to the step S48a.

At the step S48a, the value of N is increased by one, and a value obtained is taken as N, after which the program proceeds to the subsequent step S49a. At the step S49a, the value of C is increased by one, and a value obtained is taken as C, after which the program is returned to the main routine.

When the sensor SE4 does not detect the trailing edge of the sheet at the foregoing step S46a, the program is directly returned to the main routine.

A copying operation is repeated while switching the bin 210 in the sorter 20 until the number of times of sorting C reaches the set number of copies X. If the number of times of sorting C exceeds the number of copies X at the step S41a, the program proceeds to the step S410a. At the step S410a, the value of N is returned to one, after which the program proceeds to the subsequent step S411a. At the step S411a, the value of C is returned to one, after which the program further proceeds to the step S412a. At the step S412, an original switching flag instructing the switching of originals in the ADF control is set to one, after which the program is returned to the main routine.

Figure 12:
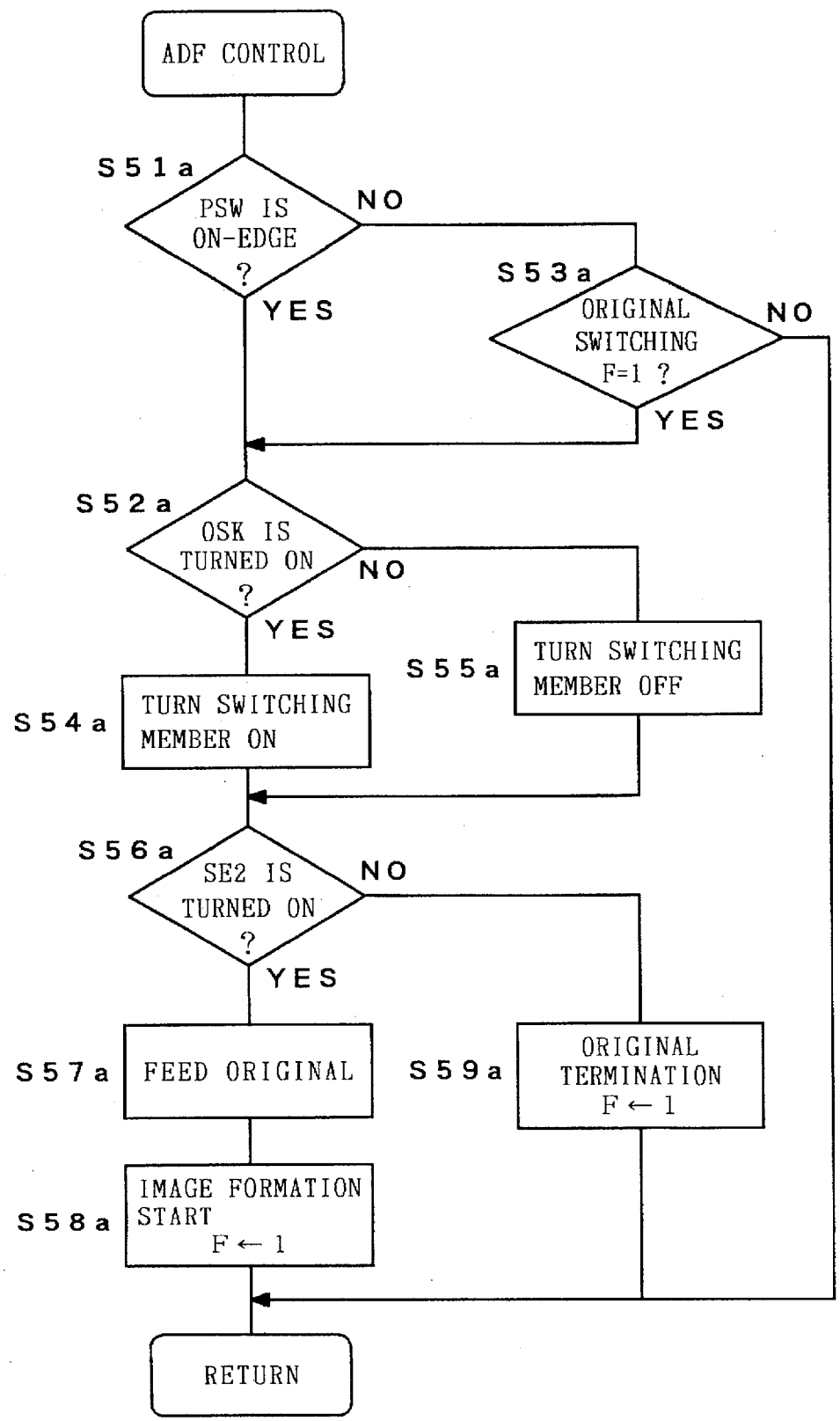
FIG. 12 is a flow chart showing a subroutine of ADF control in the main routine shown in FIG. 10.

The ADF control at the step S5a in the above-mentioned main routine proceeds in accordance with a subroutine shown in FIG. 12.

When the ADF control is started, it is first determined at the step S51a whether or not a print switch PSW is depressed. When the print switch PSW is on-edge, the program proceeds to the step S52a. On the other hand, when the print switch PSW is not on-edge, the program proceeds to the step S53a. At the step S53a, it is judged whether or not the original switching flag instructing the switching of originals is one. If the original switching flag is one, the program proceeds to the step S52a, as in the above-mentioned case where the print switch PSW is on-edge. On the other hand, if the original switching flag is not one, the program is directly returned to the main routine.

At the step S52a, it is then determined whether or not the selection key OSK for making a selection as to whether or not originals are to be stapled is turned on. When the selection key OSK is turned on, to staple the originals, the program proceeds to the step S54a. At the step S54a, the switching member 110 is turned on, to enter a state where a read original is led to the first sheet discharge tray 201 positioned in the uppermost stage in the sorter 200, after which the program proceeds to the step S56a. On the other hand, when the selection key OSK is not turned on at the step S52a, the program proceeds to the step S55a. At the step S55a, the switching member 110 is turned off, after which the program proceeds to the step S56a.

At the step S56a, the presence or absence of an original on the original set tray 101 is detected by the sensor SE2. If the original exists on the original set tray 101, the program proceeds to the step S57a. At the step S57a, the original on the original set tray 101 is fed, after which the program further proceeds to the step S58a. At the step S58a, an image formation start flag instructing the start of image formation is set to one, after which the program is returned to the main routine.

On the other hand, when there remains no original on the original set tray 101 as a result of successively feeding the originals on the original set tray 101 upon repetition of the above-mentioned operations, and the original on the original set tray 101 is not sensed by the sensor SE2 at the foregoing step S56a, the program proceeds to the step S59a. At the step S59a, an original termination flag indicating that the feeding of originals is terminated is set to one, after which the program is returned to the main routine.

Figure 13:
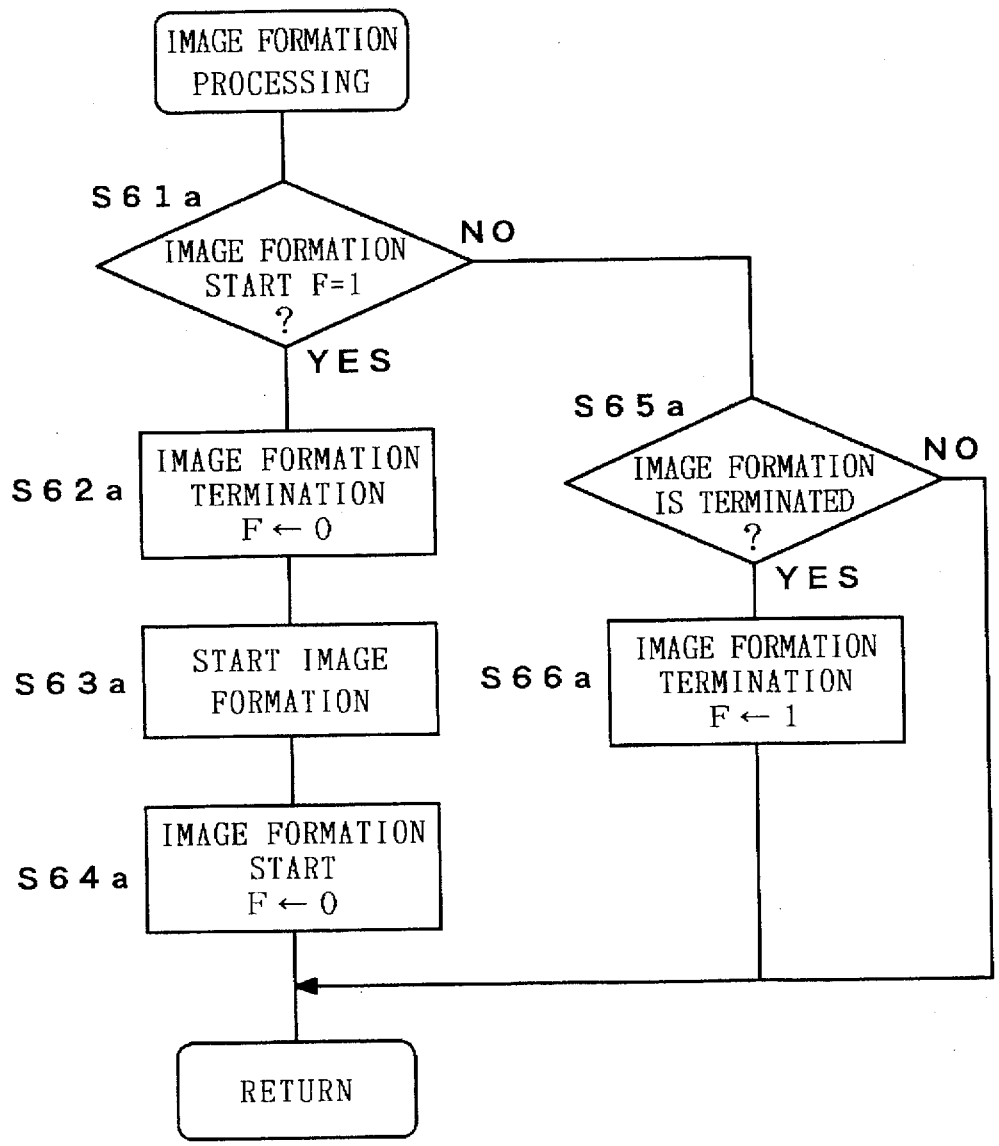
FIG. 13 is a flow chart showing a subroutine of image formation processing in the main routine shown in FIG. 10.

The image formation processing at the step S6a in the above-mentioned main routine proceeds in accordance with a subroutine shown in FIG. 13. Since the subroutine of the image formation processing is substantially the same as the subroutine of the image formation processing in the image forming apparatus according to the above-mentioned embodiment 1 and hence, the description thereof is not repeated.

Figure 14:
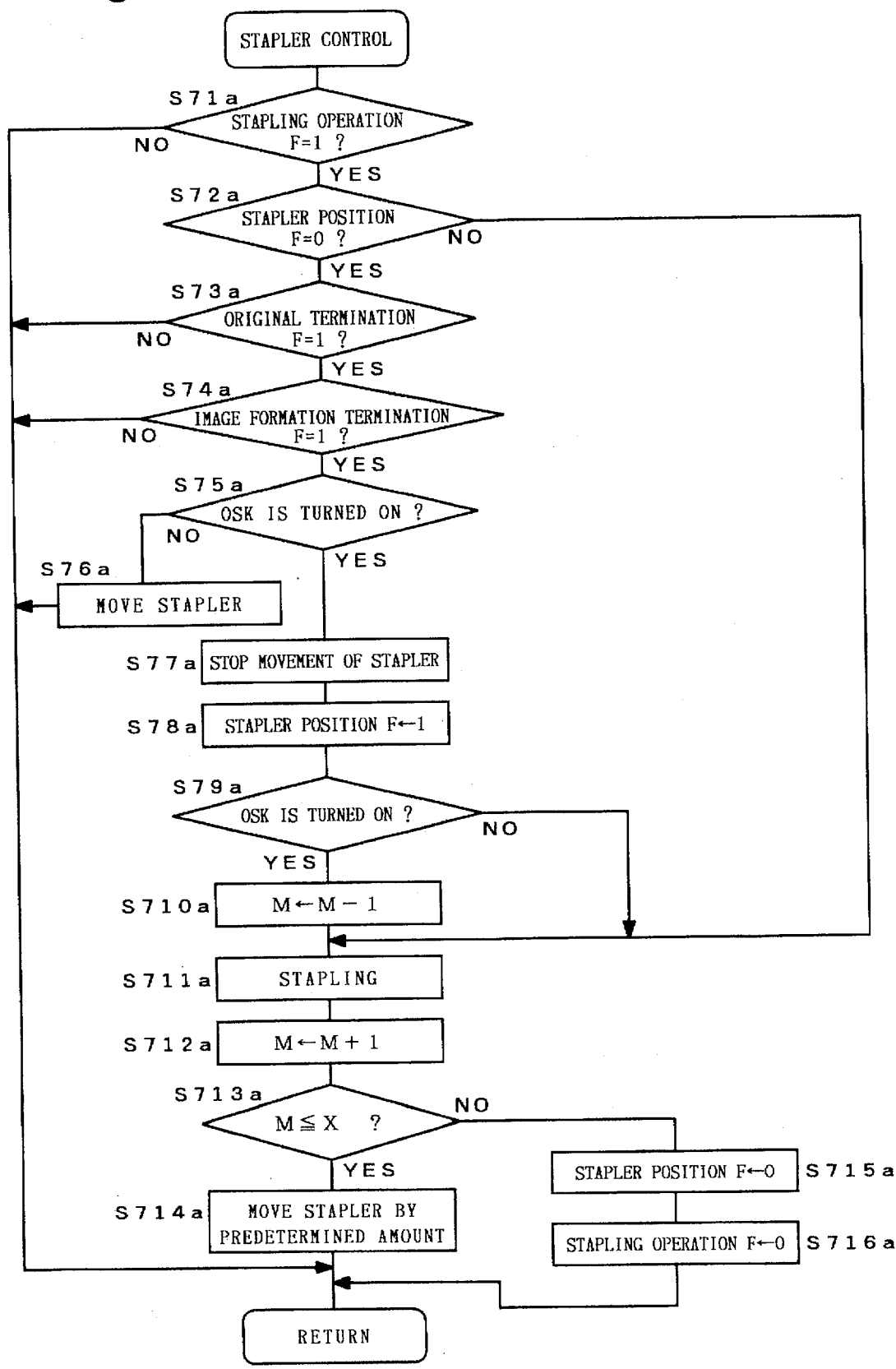
FIG. 14 is a flow chart showing a subroutine of stapler control in the main routine shown in FIG. 10.

The stapler control at the step S7a in the above-mentioned main routine proceeds in accordance with a subroutine shown in FIG. 14.

When the stapler control is started, it is first judged at the step S71a whether or not a stapling operation flag instructing a stapling operation by the input-output processing at the foregoing step S3 is set to one. The program proceeds to the subsequent step S72a if the stapling operation flag is one, while being returned to the main routine if the stapling operation flag is not one.

At the step S72a, it is judged whether or not a stapler position flag is zero. When the positioning of the stapler 300 is not terminated, so that the stapler position flag is zero, the program proceeds to the step S73a. On the other hand, if the stapler position flag is not zero upon termination of the positioning of the stapler 300, the program proceeds to the step S711a as described later.

At the step S73a, it is judged whether or not the original termination flag is one. If the original termination flag is one upon termination of the feeding of the originals on the original set tray 101, the program proceeds to the subsequent step S74a. On the other hand, if the original termination flag is not one at the step S73a, the program is returned to the main routine.

At the step S74a, it is judged whether or not the image formation termination flat is one. When the image formation termination flag is one upon termination of the image formation, the program proceeds to the subsequent step S75a. On the other hand, when the image formation is not terminated at the step S74a, so that the image formation termination flag is not one, the program is returned to the main routine.

At the step S75a, it is determined whether or not the sensor SE6 is turned on upon arrival of the stapler 300 at the position of the bin 201 positioned in the uppermost stage. When the sensor SE6 is not turned on, the program proceeds to the step S76a. At the step S76a, the stapler 300 is moved by the pulse motor, after which the program is returned to the main routine. When the stapler 300 is moved as described above, and the sensor SE6 is turned on at the step S75a, the program proceeds to the step S77a. At the step S77a, the driving of the pulse motor is stopped, to stop the movement of the stapler 300, after which the program proceeds to the subsequent step S78a.

At the step S78a, the stapler position flag indicating that the positioning of the stapler 300 is terminated is set to one, after which the program proceeds to the subsequent step S79a.

At the step S79a, it is determined whether or not the selection key OSK for making a selection as to whether or not originals are to be stapled is turned on. When the selection key OSK is turned on, so that originals discharged onto the original discharge tray 108 are stapled in addition to sheets respectively having images formed thereon, the program proceeds to the step S710a. At the step S710a, the value of the number of times of stapling M is decreased by one, and a value obtained is taken as M. The number of times of stapling M is started at zero, after which the program proceeds to the subsequent step S711a. On the other hand, when the selection key OSK is not turned on at the step S75a, the program directly proceeds to the subsequent step S711a.

At the step S711a, the stapling is performed, after which the program proceeds to the subsequent step S712a. At the step S712a, the value of the number of times of stapling M is increased by one, and a value obtained is taken as M, after which the program proceeds to the step S713a.

At the step S713a, the number of times of stapling M and the number of copies X are compared with each other. When the number of times of stapling M does not exceed the number of copies X, the program proceeds to the step S714a. At the step S714a, the stapler 300 is moved by a predetermined amount upon driving of the pulse motor by a predetermined number of pulses, after which the program is returned to the main routine.

In the subsequent stapler control carried out after the program is returned to the main routine, it is judged at the foregoing step S72a that the stapler position flag is not zero because the stapler position flag is set to one at the foregoing step S710a. The program proceeds to the step S711a from the step S72a. At the step S711a, the stapling is performed, after which the above-mentioned operations are repeated.

When the number of times of stapling M exceeds the number of copies X at the foregoing step S713a, the program proceeds to the step S715a. At the step S715a, the stapler position flag indicating that the positioning of the stapler 300 is terminated is returned to zero, after which the program proceeds to the subsequent step S716a. At the step S716a, the stapling operation flag is set to zero, to terminate the stapling operation, after which the program is returned to the main routine.

When the stapling operation flag becomes zero in the other processing at the step S8a in the above-mentioned main routine, a series of copying operations including the stapling is terminated, after which the program waits in the state where the units are initialized at the step S1a in the main routine.

In the image forming apparatus according to the present embodiment, by the above-mentioned control, the sheets discharged onto each of the sheet discharge trays 201 after the images are respectively formed thereon are automatically stapled by the stapler 300, and the originals from which the images have been respectively read are led to the first bin 201 positioned in the uppermost stage in the sorter 200, and the originals discharged onto the first bin 202 are automatically stapled by the stapler 300, similarly to the sheets discharged onto the other bin 201, when the selection key OSK for making a selection as to whether or not originals are to be stapled is turned on.

(Embodiment 3)

Figure 15:
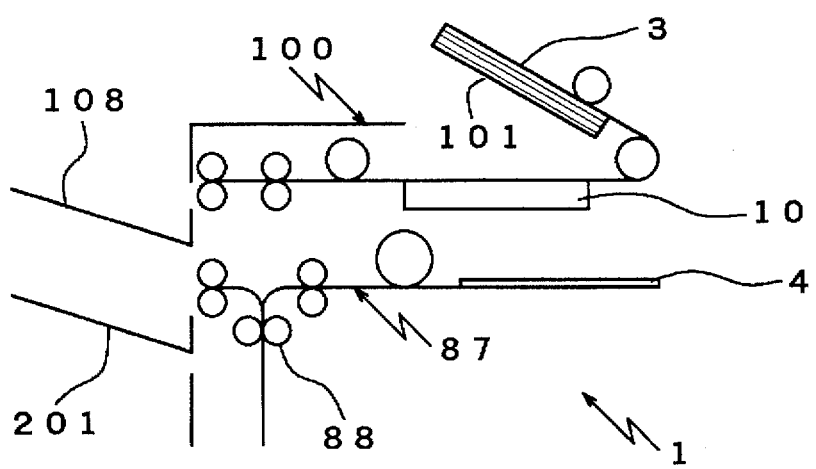
FIG. 15 is a partially schematic illustration showing a part of an image forming apparatus according to an embodiment 3 of the present invention.

In an image forming apparatus according to the present embodiment, an original discharge tray 108 onto which originals 3 are discharged and each sheet discharge tray 201 onto which sheets 4 respectively having images formed thereon are discharged are provided on the left side of a main body 1 of the apparatus, as shown in FIG. 15.

Figure 16:
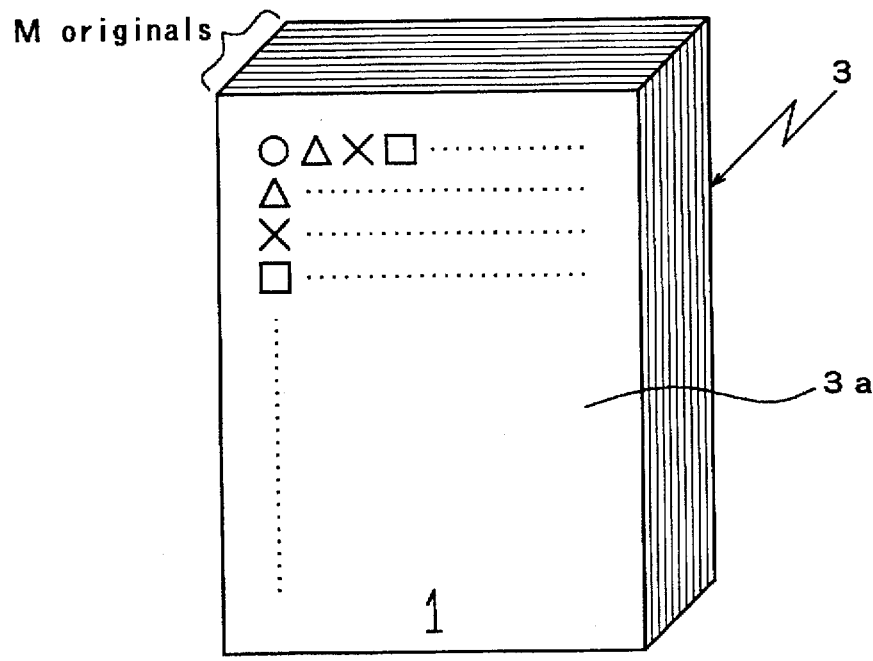
FIG. 16 is a schematic perspective view showing originals set on an original set tray in the image forming apparatus according to the embodiment 3.

In the image forming apparatus, M originals 3 are set on an original set tray 101 in such a manner that the original 3 corresponding to the first page positioned uppermost and their image surfaces 3a are directed upward, as shown in FIG. 16.

Figure 17:
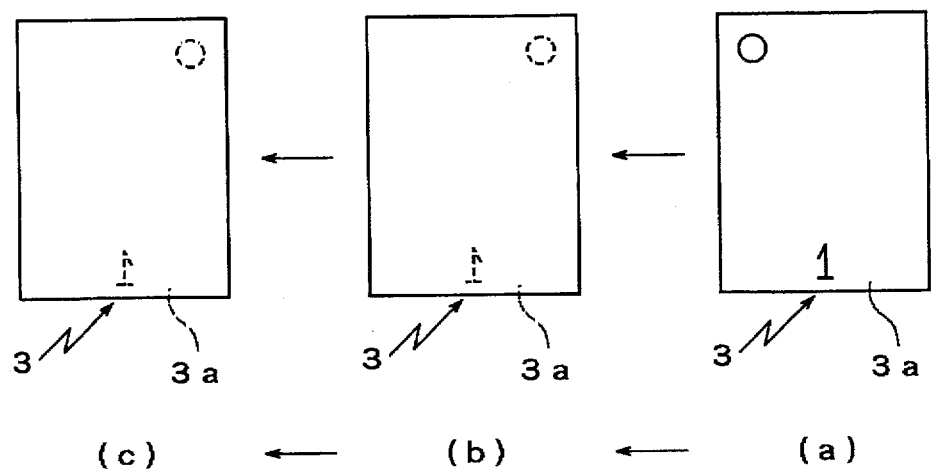
FIG. 17 is an illustration showing the states of the surface and the reverse surface of the original until the original is discharged onto an original discharge tray from the original set tray in the image forming apparatus according to the embodiment 3.

The M originals 3 thus set are successively fed in ascending order of pages from the original 3 corresponding to the first page positioned uppermost with the image surfaces 3a directed upward by an automatic document feeder 100, as shown in FIG. 15 (see FIG. 17a). The original 3 thus fed is turned over, and is led onto a reading system 10 with the image surface 3a directed downward (see FIG. 17b), and an image on the image surface 3a of the original 3 is read by the reading system 10. After the images are read, the originals 3 are successively discharged in ascending order of pages from the first page with the image surfaces 3a directed downward onto the original discharge tray 108 provided on the left side of the main body 1 of the apparatus (see FIG. 17c).

When the originals 3 are thus discharged onto the original discharge tray 108, the left shoulder portions of the image surfaces 3a of the originals 3 are positioned on the side of the main body 1 of the apparatus.

On the other hand, images are formed on the sheets 4 in the above-mentioned manner on the basis of the images read by the reading system 10.

Figure 18:
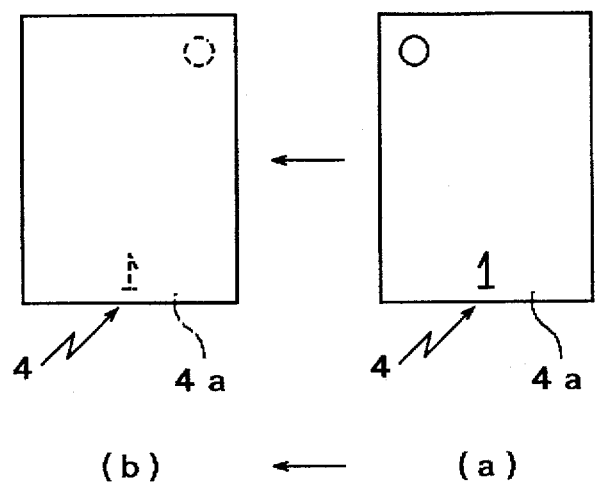
FIG. 18 is an illustration showing the states of the surface and the reverse surface of a sheet having an image formed thereon until the sheet is discharged onto a sheet discharge tray in the image forming apparatus according to the embodiment 3.

When the sheet 4 having the image thus formed thereon is fed with its image surface 4a directed upward by the above-mentioned sheet conveying means 80 (see FIG. 18a), the sheet 4 is turned over by a reversing mechanism 88 provided in a halfway portion of a conveying path 87, so that the image surface 4a of the sheet 4 is directed downward (see FIG. 18b). In this state, the sheets 4 are successively discharged in ascending order of pages from the first page onto the sheet discharge tray 201 provided on the left side of the main body 1 of the apparatus.

When the sheets 4 are thus discharged onto the sheet discharge tray 201, the left shoulder portions of the image surfaces 4a of the sheets 4 are positioned on the side of the main body 1 of the apparatus, similarly to the above-mentioned originals 3.

The left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by the above-mentioned stapler, which is not illustrated.

Figure 19:
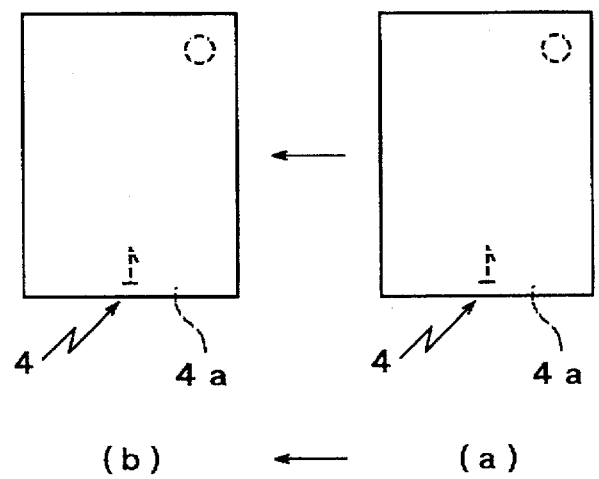
FIG. 19 is an illustration showing the states of the surface and the reverse surface of a sheet having an image formed thereon until the sheet is discharged onto a sheet discharge tray in a modified example in which the sheet is conveyed with its image surface directed downward in the image forming apparatus according to the embodiment 3.

Although in the above-mentioned embodiment, description was made of a case where the sheet 4 having the image formed thereon is guided in a state where the image surface 4a is directed upward, the present invention is not limited to the same. In a case where the sheet 4 having the image formed thereon is conveyed in a state where the image surface 4a is directed downward, as shown in FIG. 19a, the reversing mechanism 88 provided in a halfway portion of the conveying path 87 is removed, to discharge the sheet 4 as it is onto the sheet discharge tray 201, as shown in FIG. 19b.

(Embodiment 4)

Figure 20:
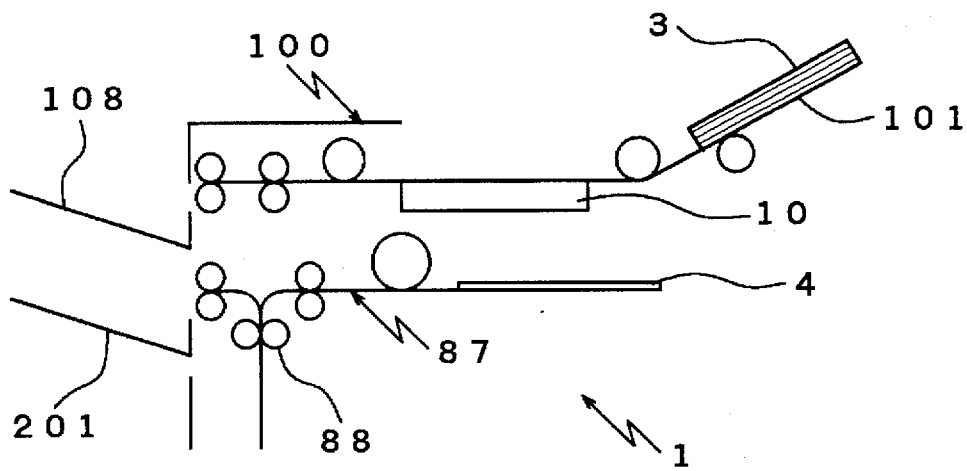
FIG. 20 is a partially schematic illustration showing a part of an image forming apparatus according to an embodiment 4 of the present invention.

Also in an image forming apparatus according to the present embodiment, an original discharge tray 108 onto which originals 3 are discharged and each sheet discharge tray 201 onto which sheets 4 respectively having images formed thereon are discharged are provided on the left side of a main body 1 of the apparatus, as shown in FIG. 20, as in the image forming apparatus according to the above-mentioned embodiment 3.

In the image forming apparatus according to the present embodiment, M originals 3 are set on an original set tray 101 in such a manner that the original 3 corresponding to the first page is positioned lowermost and their image surfaces 3a are directed downward.

Figure 21:
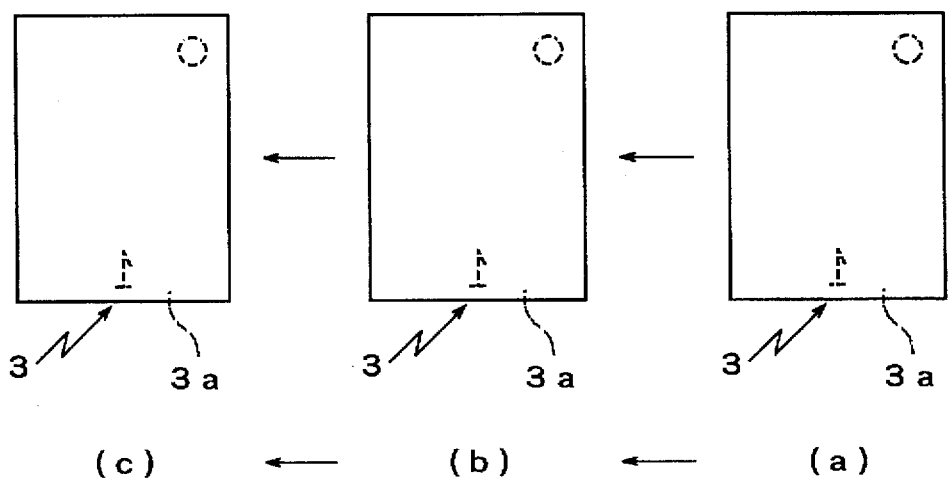
FIG. 21 is an illustration showing the states of the surface and the reverse surface of an original until the original is discharged onto an original discharge tray from an original set tray in the image forming apparatus according to the embodiment 4.

The M originals 3 thus set on the original set tray 101 are successively fed in ascending order of pages from the original 3 corresponding to the first page positioned lowermost with the image surfaces 3a directed downward by an automatic document feeder 100, as shown in FIG. 20 (see FIG. 21a). The original thus fed is led as it is onto a reading system 10 (see FIG. 21b), and an image on the image surface 3a of the original 3 is read by the reading system 10. After the images are read, the originals 3 are successively discharged in ascending order of pages from the first page with the image surfaces 3a directed downward onto the original discharge tray 108 provided on the left side of the main body 1 of the apparatus (see FIG. 21c), whereby the left shoulder portions of the image surfaces 3a of the originals 3 are positioned on the side of the main body 1 of the apparatus, as in the case of the above-mentioned embodiment 3.

On the other hand, the sheets 4 respectively having the images formed thereon on the basis of the originals 3 are successively discharged in ascending order of pages from the first page with their image surfaces 4a directed downward onto the sheet discharge tray 201 provided on the left side of the main body 1 of the apparatus, whereby the left shoulder portions of the image surfaces 4a of the sheets 4 are positioned on the side of the main body 1 of the apparatus, as in the case of the above-mentioned embodiment 3.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 3.

(Embodiment 5)

Figure 22:
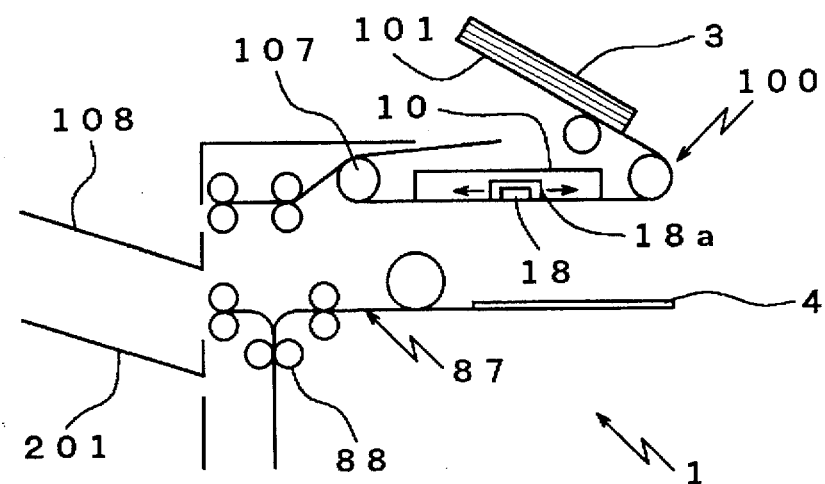
FIG. 22 is a partially schematic illustration showing a part of an image forming apparatus according to an embodiment 5 of the present invention.

Also in an image forming apparatus according to the present embodiment, an original discharge tray 108 onto which originals 3 are discharged and each sheet discharge tray 201 onto which sheets 4 respectively having images formed thereon are discharged are provided on the left side of a main body 1 of the apparatus, as shown in FIG. 22. In the image forming apparatus, an automatic document feeder 100 is provided with a reversing roller 107 for turning the original 3 over and discharging the original 3 onto the original discharge tray 108, as in the case of the above-mentioned embodiment 1. Further, in the image forming apparatus, a line sensor 18 scanned by a carriage 18a is used for a reading system 10 for reading an image on the original 3. The original 3 is led to a position under the reading system 10.

In the image forming apparatus, M originals 3 are set on an original set tray 101 in such a manner that the original 3 corresponding to the first page is positioned lowermost with their image surfaces 3a directed downward.

Figure 23:
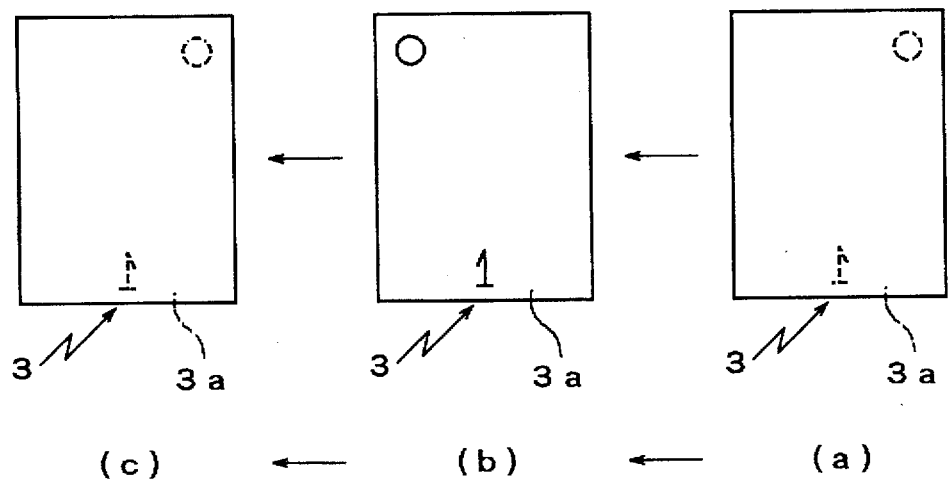
FIG. 23 is an illustration showing the states of the surface and the reverse surface of an original until the original is discharged onto an original discharge tray from an original set tray in the image forming apparatus according to the embodiment 5.

The M originals 3 thus set on the original set tray 101 are successively fed in ascending order of pages from the original 3 corresponding to the first page positioned lowermost with the image surfaces 3a directed downward by the automatic document feeder 100, as shown in FIG. 22 (see FIG. 23a). The original 3 thus fed is turned over, and is led to a position under the reading system 10 with the image surface 3a directed upward (see FIG. 23b), and an image on the image surface 3a of the original 3 is read by the reading system 10. Thereafter, the original 3 is turned over by the reversing roller 107. The originals 3 are successively discharged in ascending order of pages from the first page with the image surfaces 3a directed downward onto the original discharge tray 108 provided on the left side of the main body 1 of the apparatus (see FIG. 23c), whereby the left shoulder portions of the image surfaces 3a of the originals 3 are positioned on the side of the main body 1 of the apparatus, as in the case of the above-mentioned embodiment 3.

On the other hand, the sheets 4 respectively having the images formed thereon on the basis of the originals 3 are successively discharged in ascending order of pages from the first page with their image surfaces 4a directed downward onto the sheet discharge tray 201 provided on the left side of the main body 1 of the apparatus, whereby the left shoulder portions of the image surfaces 4a of the sheets 4 are positioned on the side of the main body 1 of the apparatus, as in the case of the above-mentioned embodiment 3.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 3.

(Embodiment 6)

Figure 24:
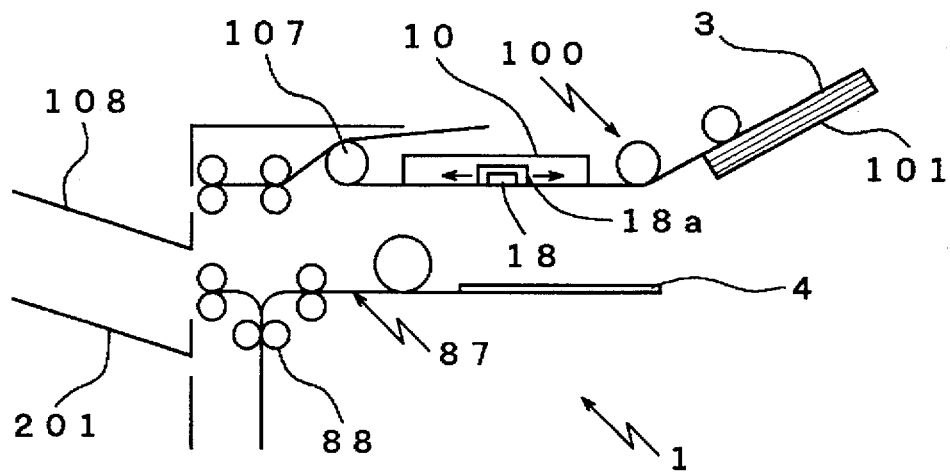
FIG. 24 is a partially schematic illustration showing a part of an image forming apparatus according to an embodiment 6 of the present invention.

Also in an image forming apparatus according to the present embodiment, an original discharge tray 108 onto which originals 3 are discharged and each sheet discharge tray 201 onto which sheets 4 respectively having images formed thereon are discharged are provided on the left side of a main body 1 of the apparatus, an automatic document feeder 100 is provided with a reversing roller 107 for turning the original 3 over and discharging the original 3 onto the original discharge tray 108, and a line sensor 18 scanned by a carriage 18a is used for a reading system 10 for reading an image on the original 3, as shown in FIG. 24, as in the image forming apparatus according to the above-mentioned embodiment 5.

In the image forming apparatus, M originals 3 are set on an original set tray 101 in such a manner that the original 3 corresponding to the first page is positioned uppermost with their image surfaces 3a directed upward.

Figure 25:
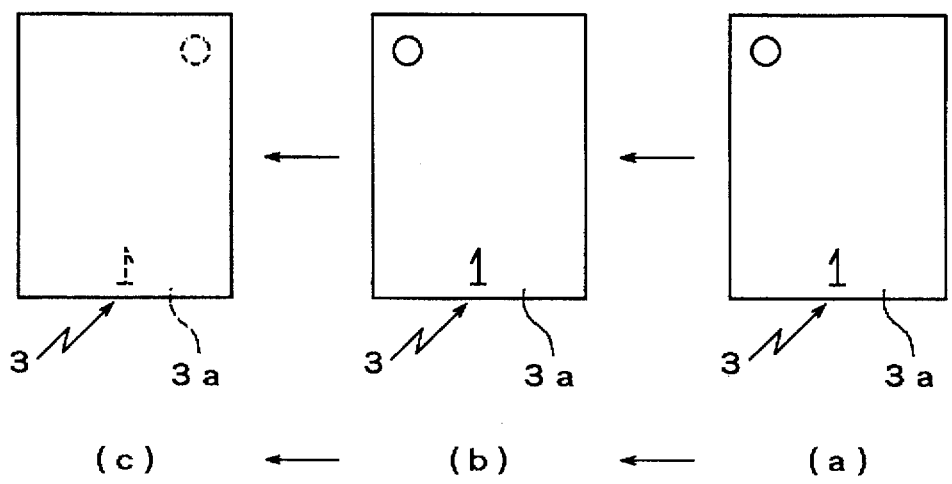
FIG. 25 is an illustration showing the states of the surface and the reverse surface of an original until the original is discharged onto an original discharge tray from an original set tray in the image forming apparatus according to the embodiment 6.

The M originals 3 thus set on the original set tray 101 are successively fed in ascending order of pages from the original 3 corresponding to the first page positioned uppermost with the image surfaces 3a directed upward by the automatic document feeder 100, as shown in FIG. 24 (see FIG. 25a). The original thus fed is led as it is to a position under the reading system 10 (see FIG. 25b), and an image on the image surface 3a of the original 3 is read by the reading system 10. Thereafter, the original 3 is turned over by the reversing roller 107. The originals 3 are successively discharged in ascending order of pages from the first page with the image surfaces 3a directed downward onto the original discharge tray 108 provided on the left side of the main body 1 of the apparatus (see FIG. 25c), whereby the left shoulder portions of the image surfaces 3a of the originals 3 are positioned on the side of the main body 1 of the apparatus, as in the case of the above-mentioned embodiment 3.

On the other hand, the sheets 4 respectively having the images formed thereon on the basis of the originals 3 are successively discharged in ascending order of pages from the first page with their image surfaces 4a directed downward onto the sheet discharge tray 201 provided on the left side of the main body 1 of the apparatus, whereby the left shoulder portions of the image surfaces 4a of the sheets 4 are positioned on the side of the main body 1 of the apparatus, as in the case of the above-mentioned embodiment 3.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 3.

(Embodiment 7)

Figure 26:
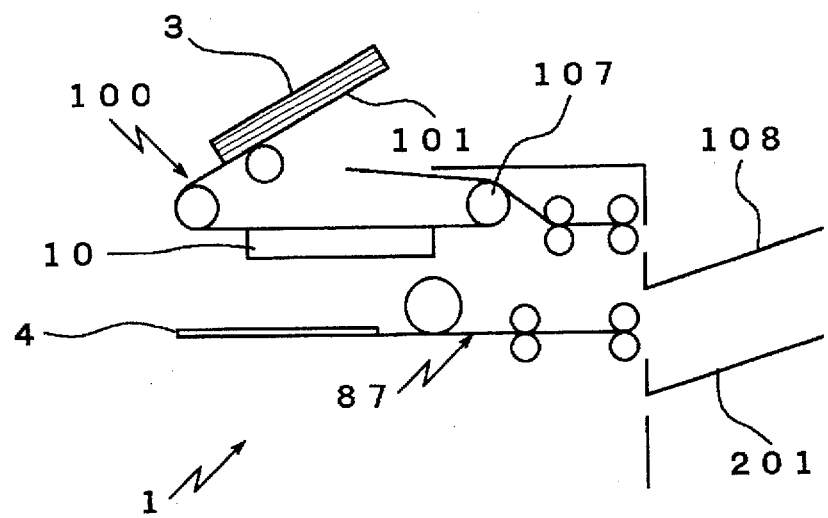
FIG. 26 is a partially schematic illustration showing a part of an image forming apparatus according to an embodiment 7 of the present invention.

In an image forming apparatus according to the present embodiment, an original discharge tray 108 onto which originals 3 are discharged and each sheet discharge tray 201 onto which sheets 4 respectively having images formed thereon are discharged are provided on the right side of a main body 1 of the apparatus, and an automatic document feeder 100 is provided with a reversing roller 107 for turning the original 3 over and discharging the original 3 onto the original discharge tray 108, as shown in FIG. 26.

In the image forming apparatus, M originals 3 are set on an original set tray 101 in such a manner that the original 3 corresponding to the first page is positioned uppermost with their image surfaces 3a directed upward.

Figure 27:
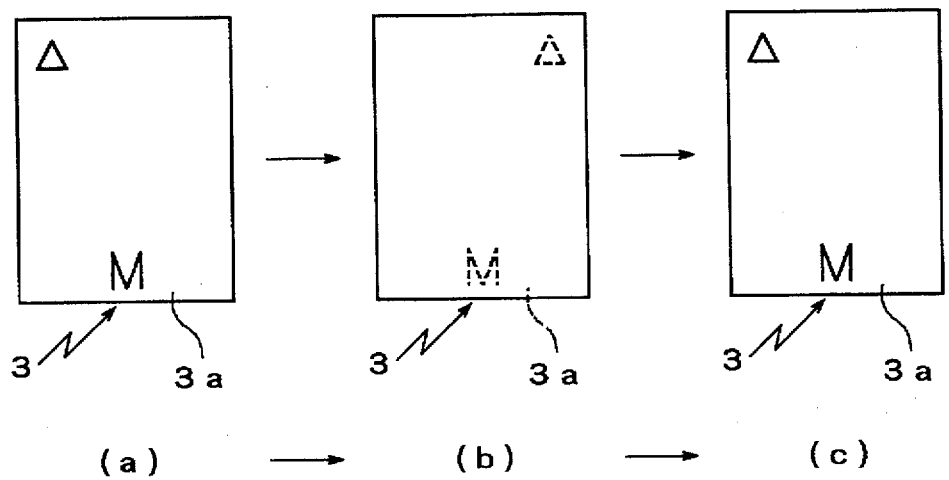
FIG. 27 is an illustration showing the states of the surface and the reverse surface of an original until the original is discharged onto an original discharge tray from an original set tray in the image forming apparatus according to the embodiment 7.

The M originals 3 thus set on the original set tray 101 are successively fed in descending order of pages from the original 3 corresponding to the final page M positioned lowermost with the image surfaces 3a directed upward by the automatic document feeder 100 (see FIG. 27a). The original 3 thus fed is turned over, and is led onto a reading system 10 with the image surface 3a directed downward (see FIG. 27b), and an image on the image surface 3a of the original 3 is read by the reading system 10. After the image is thus read, the original 3 in a state where the image surface 3a is directed downward is turned over by the reversing roller 107. Thereafter, the originals 3 are successively discharged in descending order of pages from the final page M with the image surfaces 3a directed upward onto the original discharge tray 108 provided on the right side of the main body 1 of the apparatus (see FIG. 27c).

When the originals 3 are discharged onto the original discharge ray 108, the originals 3 are successively stacked on the original discharge tray 108 in such a manner that the original 3 corresponding to the first page is positioned uppermost with the image surfaces 3a directed upward, and the left shoulder portions of the image surfaces 3a of the originals 3 are positioned on the side of the main body 1 of the apparatus.

Figure 28:
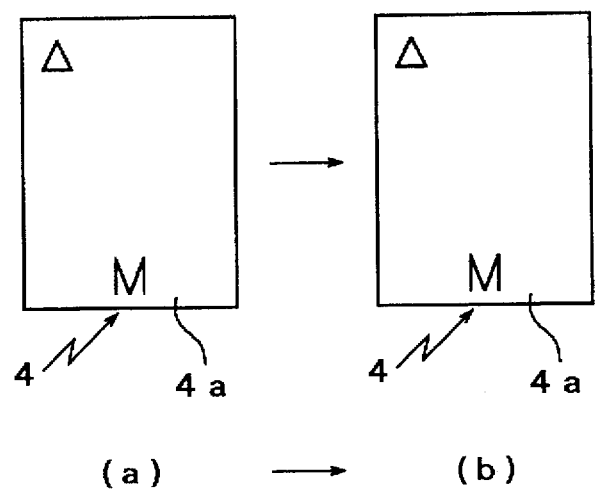
FIG. 28 is an illustration showing the states of the surface and the reverse surface of a sheet having an image formed thereon until the sheet is discharged onto a sheet discharge tray in the image forming apparatus according to the embodiment 7.

On the other hand, images are successively formed on the sheets 4 in descending order of pages from the final page M on the basis of the images read by the reading system 10, and the sheets 4 respectively having the images formed thereon are successively fed in descending order of pages from the final page M with the image surfaces 4a directed upward by sheet conveying means 80 (see FIG. 28a). The sheets 4 are discharged as they are onto the sheet discharge tray 201 provided on the right side of the main body 1 of the apparatus.

As a result, the sheets 4 respectively having the images formed thereon are also successively stacked on the sheet discharge tray 201 in such a manner that the sheet 4 corresponding to the first page is positioned uppermost with the image surfaces 4a directed upward, and the left shoulder portions of the image surfaces 4a of the sheets 4 are positioned on the side of the main body 1 of the apparatus, similarly to the above-mentioned originals 3.

The left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler in the above-mentioned manner, which is not illustrated.

Figure 29:
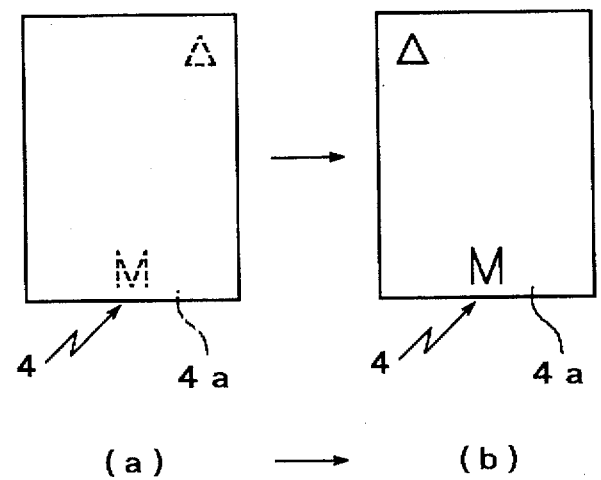
FIG. 29 is an illustration showing the states of the surface and the reverse surface of a sheet having an image formed thereon until the sheet is discharged onto a sheet discharge tray in a modified example in which the sheet is conveyed with its image surface directed downward in the image forming apparatus according to the embodiment 7.

Although in the present embodiment, description was made of a case where the sheet 4 having the image formed thereon is guided in a state where the image surface 4a is directed upward, the present invention is not limited to the same. In a case where the sheet 4 having the image formed thereon is conveyed in a state where the image surface 4a is are respectively stapled by a stapler in the above-mentioned directed downward, as shown in FIG. 29a, a reversing mechanism is provided in a halfway portion of a conveying path 87, which is not illustrated, as in the image forming apparatus according to the above-mentioned embodiment 3, so that the sheet 4 is turned over by the reversing mechanism, and is discharged onto the sheet discharge tray 201 with its image surface 4a directed upward, as shown in FIG. 29.

(Embodiment 8)

Figure 30:
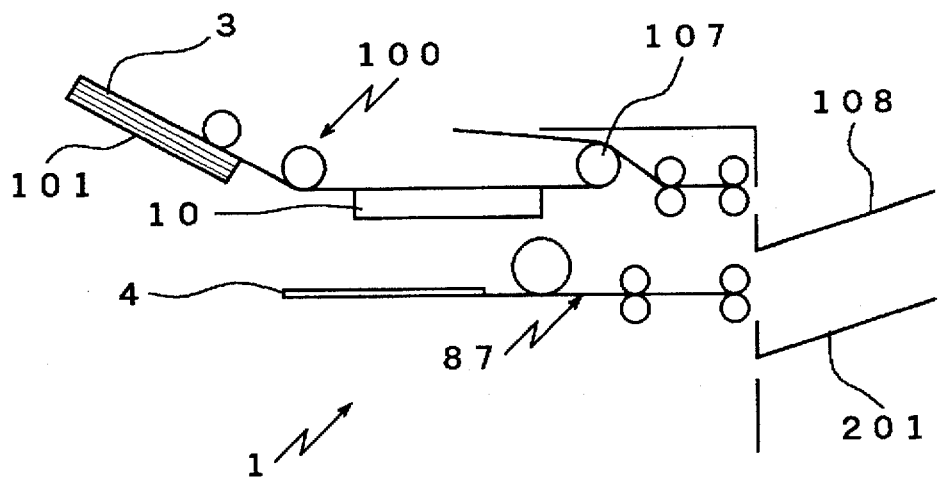
FIG. 30 is a partially schematic illustration showing a part of an image forming apparatus according to an embodiment 8 of the present invention.

Also in an image forming apparatus according to the present embodiment, an original discharge tray 108 onto which originals 3 are discharged and each sheet discharge tray 201 onto which sheets 4 respectively having images formed thereon are discharged are provided on the right side of a main body 1 of the apparatus, and an automatic document feeder 100 is provided with a reversing roller 107 for turning the original 3 over and discharging the original 3 onto the original discharge tray 108, as shown in FIG. 30, as in the image forming apparatus according to the above-mentioned embodiment 7.

In the image forming apparatus according to the present embodiment, M originals 3 are set on an original set tray 101 in such a manner that the original 3 corresponding to the first page is positioned lowermost and their image surfaces 3a are directed downward.

Figure 31:
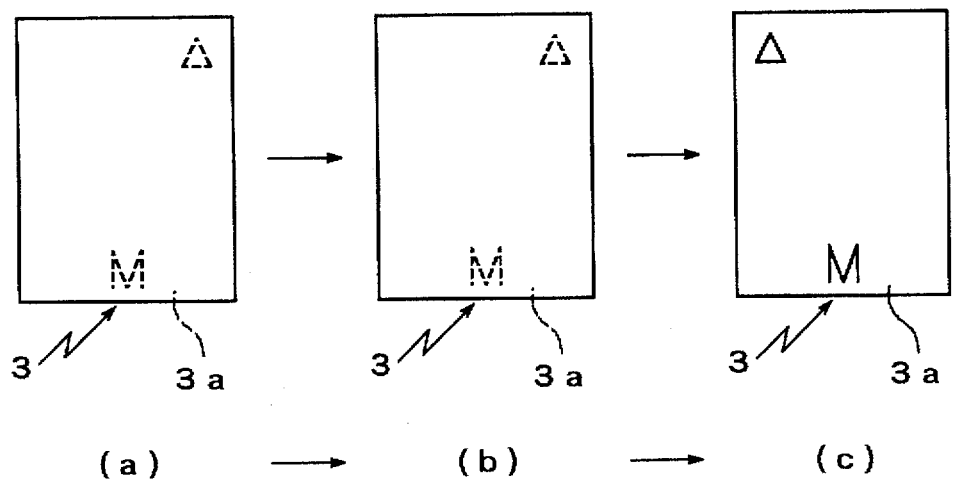
FIG. 31 is an illustration showing the states of the surface and the reverse surface of an original until the original is discharged onto an original discharge tray from an original set tray in the image forming apparatus according to the embodiment 8.

The M originals 3 thus set on the original set tray 101 are successively fed in descending order of pages from the original 3 corresponding to the final page M positioned uppermost with the image surfaces 3a directed downward by the automatic document feeder 100 (see FIG. 31a). The original thus fed is led as it is onto a reading system 10 (see FIG. 31b), and an image on the image surface 3a of the original 3 is read by the reading system 10. After the image on the original 3 is thus read, the original 3 in a state where the image surface 3a is directed downward is turned over by the reversing roller 107. Thereafter, the originals 3 are successively discharged in descending order of pages from the final page M with the image surfaces 3a directed upward onto the original discharge tray 108 provided on the right side of the main body 1 of the apparatus (see FIG. 31c). The originals 3 are successively stacked on the original discharge tray 108 in such a manner that the original 3 corresponding to the first page is positioned uppermost with the image surfaces 3a directed upward, and the left shoulder portions of the image surfaces 3a of the originals 3 are positioned on the side of the main body 1 of the apparatus, as in the case of the above-mentioned embodiment 7.

On the other hand, the sheets 4 respectively having the images formed thereon on the basis of the originals 3 are successively discharged in descending order of pages from the final page M with their image surfaces 4a directed upward onto the sheet discharge tray 201 provided on the right side of the main body 1 of the apparatus, the sheets 4 are successively stacked on the sheet discharge tray 201 in such a manner that the sheet 4 corresponding to the first page is positioned uppermost with the image surfaces 4a directed upward, and the left shoulder portions of the image surfaces 4a of the sheets 4 are positioned on the side of the main body 1 of the apparatus, as in the case of the above-mentioned embodiment 7.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 7.

(Embodiment 9)

Figure 32:
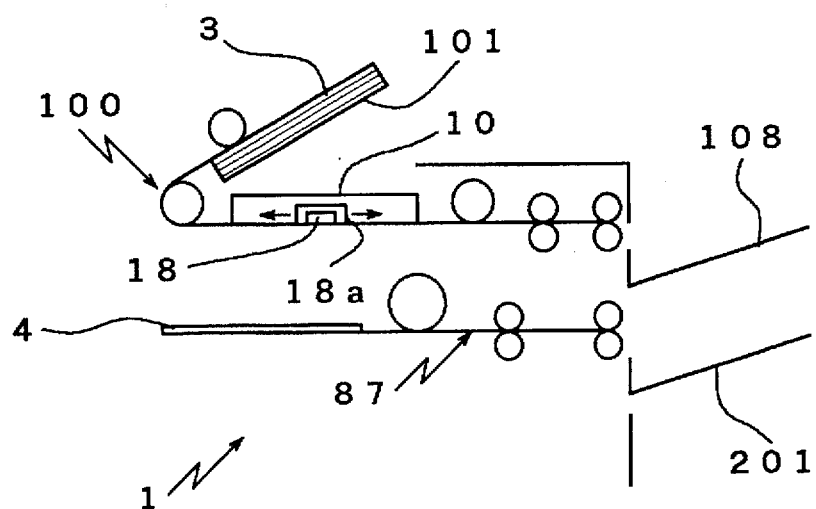
FIG. 32 is a partially schematic illustration showing a part of an image forming apparatus according to an embodiment 9 of the present invention.

In an image forming apparatus according to the present embodiment, an original discharge tray 108 onto which originals 3 are discharged and each sheet discharge tray 201 onto which sheets 4 respectively having images formed thereon are discharged are provided on the right side of a main body 1 of the apparatus, and a line sensor 18 scanned by a carriage 18a is used for a reading system 10 for reading an image on the original 3, as shown in FIG. 32, as in the image forming apparatus according to the above-mentioned embodiment 7. The original 3 is led to a position under the reading system 10.

In the image forming apparatus according to the present embodiment, M originals 3 are set on an original set tray 101 in such a manner that the original 3 corresponding to the first page is positioned lowermost and their image surfaces 3a are directed downward.

Figure 33:
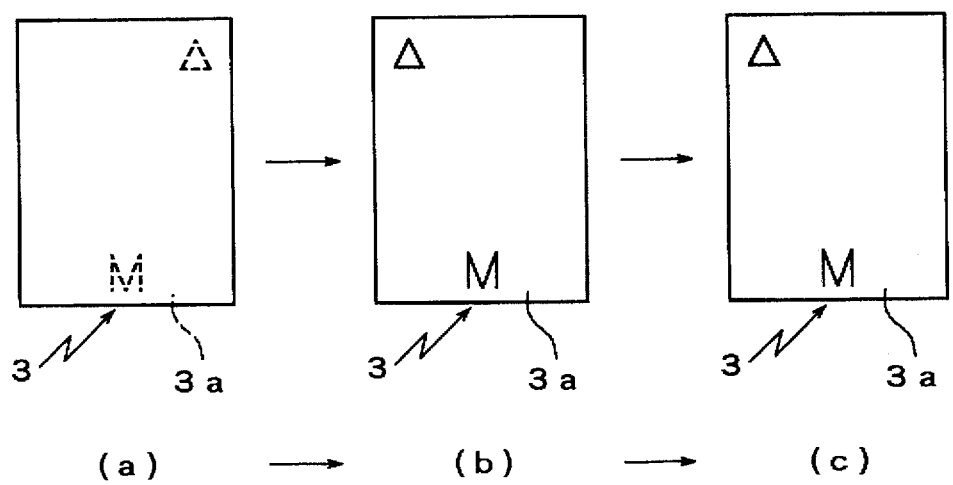
FIG. 33 is an illustration showing the states of the surface and the reverse surface of an original until the original is discharged onto an original discharge tray from an original set tray in the image forming apparatus according to the embodiment 9.

The M originals 3 thus set on the original set tray 101 are successively fed in descending order of pages from the original 3 corresponding to the final page M positioned uppermost with the image surfaces 3a directed downward by an automatic document feeder 100 (see FIG. 33a). The original thus fed is turned over, and is led to a position under the reading system 10 with the image surface 3a directed upward (see FIG. 33b), and an image on the image surface 3a of the original 3 is read by the reading system 10. Thereafter, the originals 3 are successively discharged in descending order of pages from the final page M with the image surfaces 3a directed upward onto the original discharge tray 108 provided on the right side of the main body 1 of the apparatus (see FIG. 33c). The originals 3 are successively stacked on the original discharge tray 108 in such a manner that the original 3 corresponding to the first page is positioned uppermost with the image surfaces 3a directed upward, and the left shoulder portions of the image surfaces 3a of the originals 3 are positioned on the side of the main body 1 of the apparatus, as in the case of the above-mentioned embodiment 7.

On the other hand, the sheets 4 respectively having the images formed thereon on the basis of the originals 3 are successively discharged in descending order of pages from the final page M with their image surfaces 4a directed upward onto the sheet discharge tray 201 provided on the right side of the main body 1 of the apparatus, the sheets 4 are successively stacked on the sheet discharge tray 201 in such a manner that the sheet 4 corresponding to the first page is positioned uppermost with the image surfaces 4a directed upward, and the left shoulder portions of the image surfaces 4a of the sheets 4 are positioned on the side of the main body 1 of the apparatus, as in the case of the above-mentioned embodiment 7.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 7.

(Embodiment 10)

Figure 34:
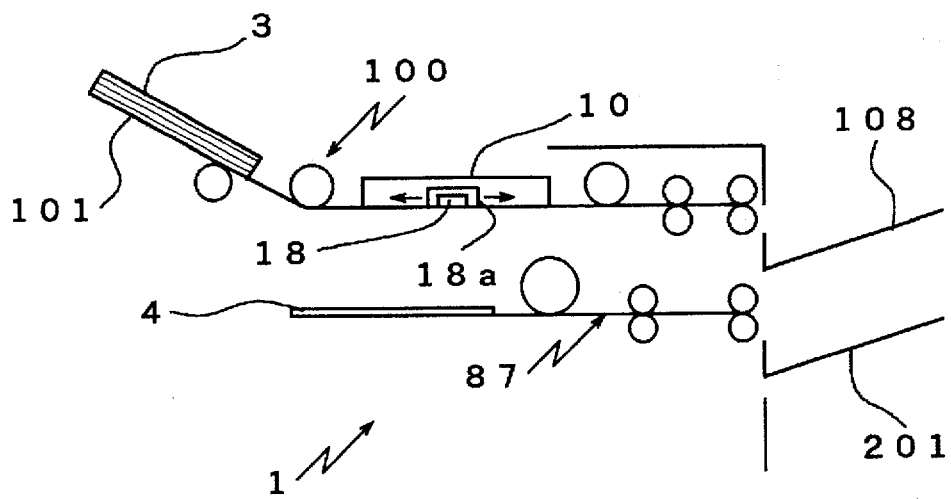
FIG. 34 is a partially schematic illustration showing a part of an image forming apparatus according to an embodiment 10 of the present invention.

In an image forming apparatus according to the present embodiment, an original discharge tray 108 onto which originals 3 are discharged and each sheet discharge tray 201 onto which sheets 4 respectively having images formed thereon are discharged are provided on the right side of a main body 1 of the apparatus, and a line sensor 18 scanned by a carriage 18a is used for a reading system 10 for reading an image on the original 3, as shown in FIG. 34, as in the image forming apparatus according to the above-mentioned embodiment 9. The original 3 is led to a position under the reading system 10.

In the image forming apparatus according to the present embodiment, M originals 3 are set on an original set tray 101 in such a manner that the original 3 corresponding to the first page is positioned uppermost and their image surfaces 3a are directed upward.

Figure 35:
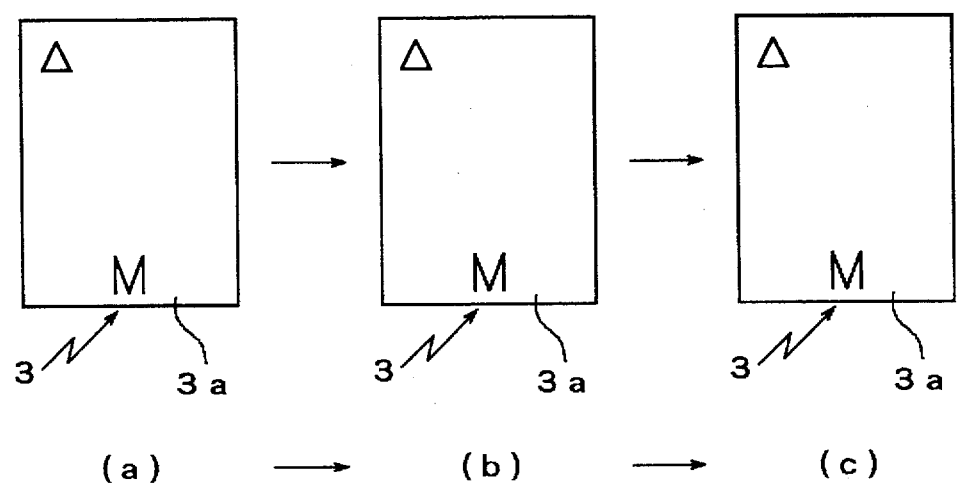
FIG. 35 is an illustration showing the states of the surface and the reverse surface of an original until the original is discharged onto an original discharge tray from an original set tray in the image forming apparatus according to the embodiment 10.

The M originals 3 thus set on the original set tray 101 are successively fed in descending order of pages from the original 3 corresponding to the final page M positioned lowermost with the image surfaces 3a directed upward by an automatic document feeder 100 (see FIG. 35a). The original 3 is led to a position under the reading system 10 as it is with the image surface 3a directed upward (see FIG. 35b), and an image on the image surface 3a of the original 3 is read by the reading system 10. Thereafter, the originals 3 are successively discharged in descending order of pages from the final page M with the image surfaces 3a directed upward onto the original discharge tray 108 provided on the right side of the main body 1 of the apparatus (see FIG. 35c). The originals 3 are successively stacked on the original discharge trays 108 in such a manner that the original 3 corresponding to the first page is positioned uppermost with the image surfaces 3a directed upward, and the left shoulder portions of the image surfaces 3a of the originals 3 are positioned on the side of the main body 1 of the apparatus, as in the case of the above-mentioned embodiment 7.

On the other hand, the sheets 4 respectively having the images formed thereon on the basis of the originals 3 are successively discharged in descending order of pages from the final page M with the image surfaces 4a directed upward onto the sheet discharge tray 201 provided on the right side of the main body 1 of the apparatus, the sheets 4 are successively stacked on the sheet discharge tray 201 in such a manner that the sheet 4 corresponding to the first page is positioned uppermost with the image surfaces 4a directed upward, and the left shoulder portions of the image surfaces 4a of the sheets 4 are positioned on the side of the main body 1 of the apparatus, as in the case of the above-mentioned embodiment 7.

Also in the present embodiment, the left shoulder portions of the image surfaces 3a of the originals 3 discharged onto the original discharge tray 108 and the left shoulder portions of the image surfaces 4a of the sheets 4 discharged onto the sheet discharge tray 201 are respectively stapled by a stapler, as in the case of the above-mentioned embodiment 7.

(Embodiment 11)

Figure 36:
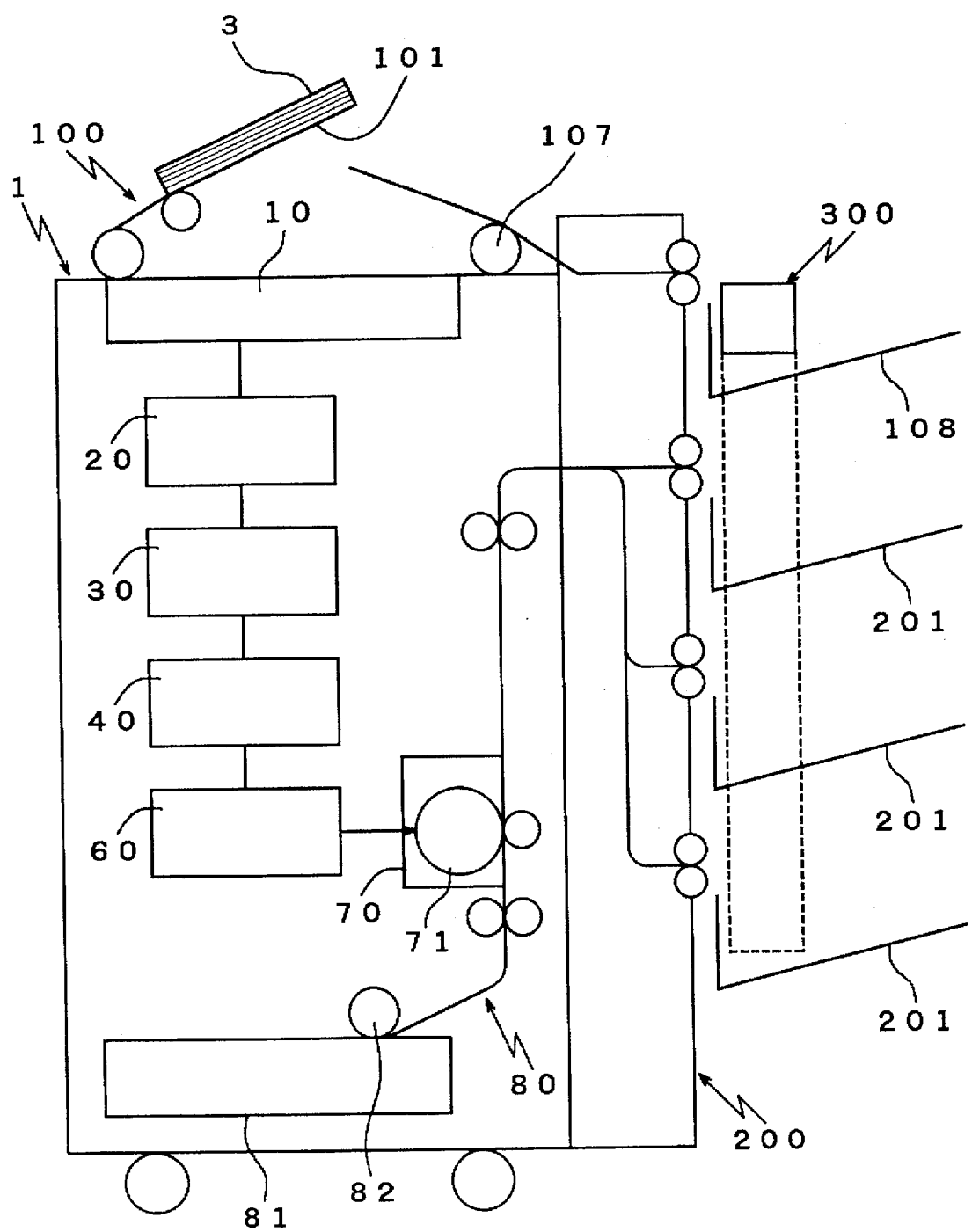
FIG. 36 is a schematic illustration showing an image forming apparatus according to an embodiment 11 of the present invention.

In an image forming apparatus according to the present embodiment, an original discharge tray 108 onto which originals 3 are discharged and sheet discharge trays 201 onto which sheets 4 respectively having images formed thereon are discharged are provided on the right side of a main body 1 of the apparatus, and an automatic document feeder 100 is provided with a reversing roller 107 for turning the original 3 over and discharging the original 3 onto the original discharge tray 108, as shown in FIG. 36, as in the image forming apparatus according to the above-mentioned embodiment 7. The originals 3 are set on an original set tray 101 in such a manner that the original 3 corresponding to the first page is positioned uppermost with their image surfaces 3a directed upward.

The originals 3 are successively fed in descending order of pages from the original 3 corresponding to the final page M positioned lowermost with the image surfaces 3a directed upward by the automatic document feeder 100. The original 3 thus fed is turned over, and is led onto a reading system 10 with the image surface 3a directed downward, and an image on the image surface 3a of the original 3 is read by the reading system 10. After the image is read, the original 3 in a state where the image surface 3a is directed downward is turned over by the reversing roller 107. Thereafter, the originals 3 are successively discharged in descending order of pages from the final page M with the image surfaces 3a directed upward onto the original discharge tray 108 provided on the right side of the main body of the apparatus 1. As a result, the originals 3 are successively stacked on the original discharge tray 108 in such a manner that the original 3 corresponding to the first page is positioned uppermost with the image surfaces 3a directed upward, and the left shoulder portions of the image surfaces 3a of the originals 3 are positioned on the side of the main body 1 of the apparatus.

On the other hand, image data of the original 3 read by the reading system 10 as described above is transmitted to an image data processing unit 20, the image data is converted into printing data by the image data processing unit 20, and the printing data is transmitted from the image data processing unit 20 to a memory unit 30, and is further transmitted from the memory unit 30 to an image formation processing unit 40.

An optical system 60 is driven by the image formation processing unit 40, whereby a toner image is formed on a photosensitive drum 71 in an image forming system 70 as described above. The toner image is transferred to the sheet conveyed by sheet conveying means 80, whereby an image based on the image on the original 3 is formed on the sheet.

The sheets respectively having the images formed thereon are led to a sorter 200, and are discharged onto a predetermined number of sheet discharge trays 201 corresponding to the number of copies. The sheets are successively discharged onto each of the sheet discharge trays 201 in descending order of pages from the final page with the image surfaces directed upward, as in the case of the above-mentioned embodiment 7.

As a result, the originals 3 and a predetermined number of copies of sheets respectively having the images formed thereon are successively stacked in a state where the original 3 and the sheet corresponding to the first page are positioned uppermost with the image surfaces directed upward in such a manner that the left shoulder portions of the image surfaces are positioned on the side of the main body 1 of the apparatus on the original discharge trays 108 and the respective sheet discharge trays 201 which are provided on the right side of the main body 1 of the apparatus.

In the image forming apparatus according to the present embodiment, a stapler 300 is so provided as to be movable in the positions of the original discharge tray 108 and the sheet discharge trays 201, as in the image forming apparatus according to the above-mentioned embodiment 1.

When the originals 3 are stapled similarly to the sheets 4 respectively having the images formed thereon, the stapler 300 is moved in the positions of the original discharge tray 108 and the sheet discharge trays 201, and the originals 3 discharged onto the original discharge tray 108 and the sheets discharged onto each of the sheet discharge trays 201 are respectively stapled in the left shoulder portions of the image surfaces by the stapler 300, as in the case of the above-mentioned embodiment 1.

(Embodiment 12)

Figure 37:
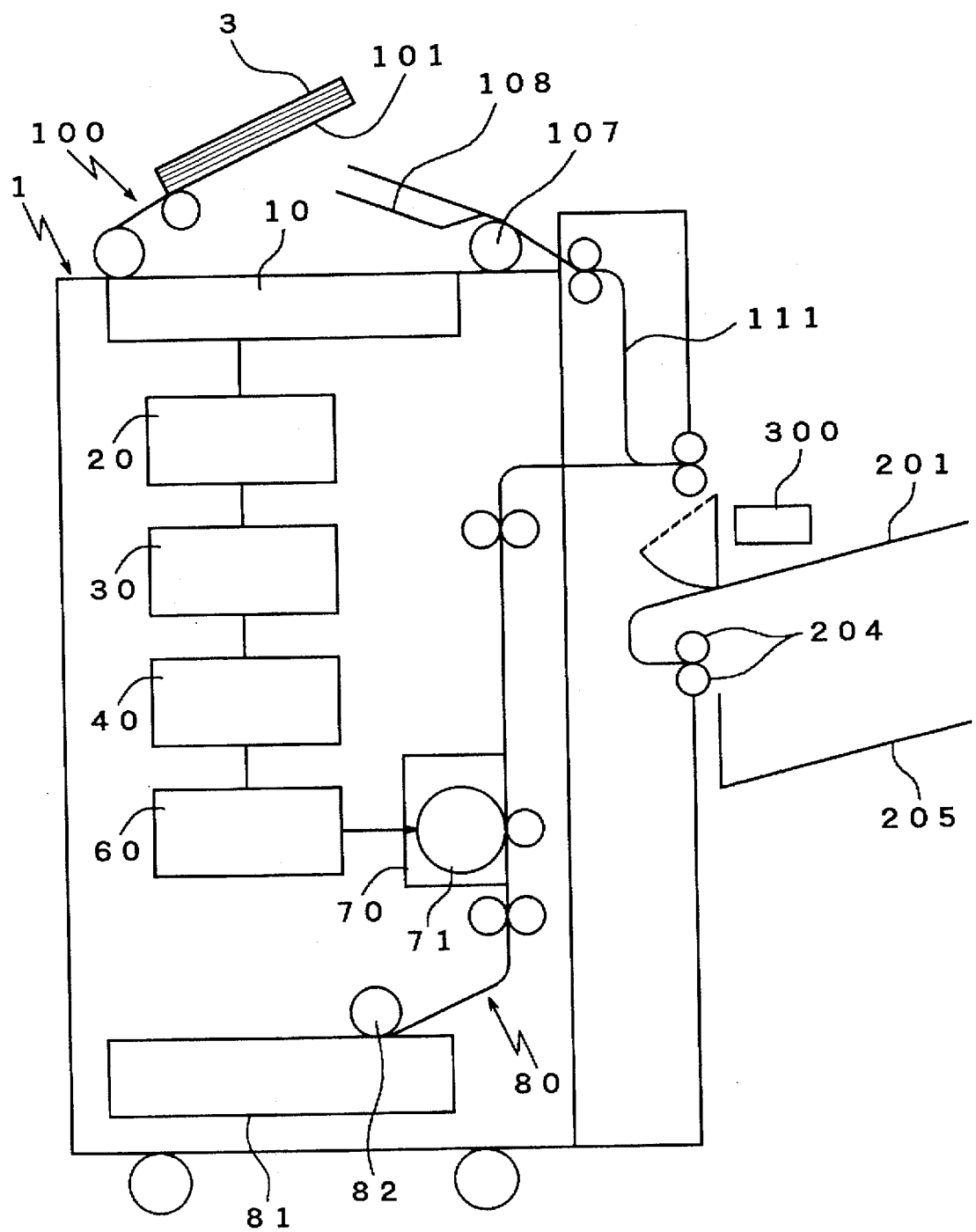
FIG. 37 is a schematic illustration showing an image forming apparatus according to an embodiment 12 of the present invention.

In an image forming apparatus according to the present embodiment, an automatic document feeder 100 is provided with a reversing roller 107 for turning an original 3 from which an image has been read over, and an original discharge tray 108 onto which the original 3 is discharged is provided so as to connect with the reversing roller 107, as shown in FIG. 37. One sheet discharge tray 201 onto which a sheet 4 having an image formed thereon is discharged is provided on the right side of a main body 1 of the apparatus. A stapler 300 is provided in the vicinity of the sheet discharge tray 201, and a containing tray 205 containing the original 3 and the sheet 4 sent from the sheet discharge tray 201 by a feeding roller 204 is provided below the sheet discharge tray 201.

In the image forming apparatus according to the present embodiment, a path 111 leading the original 3 to the sheet discharge tray 201 is provided, so that the original 3 is discharged onto either one of the original discharge tray 108 and the sheet discharge tray 201 by switching means (not shown) for controlling the driving of the reversing roller 107.

Also in the image forming apparatus, the originals 3 are set on an original set tray 101 in such a manner that the original 3 corresponding to the first page is positioned uppermost with their image surfaces 3a directed upward, as in the image forming apparatus according to the above-mentioned embodiment 11.

In the image forming apparatus, the originals 3 set on the original set tray 101 are successively fed in descending order of pages from the original 3 corresponding to the final page positioned lowermost by the automatic document feeder 100. The original 3 is turned over, and is led onto a reading system 10 with the image surface directed downward, and an image on the original 3 is read by the reading system 10. Thereafter, the original 3 is led to the reversing roller 107.

When the originals 3 are not stapled, the original 3 is turned over by the reversing roller 107. The originals 3 are successively set in descending order of pages from the final page with the image surfaces directed upward on the original discharge tray 108.

On the other hand, when the originals 3 are stapled in the image forming apparatus, the original 3 from which the image has been read is turned over by the reversing roller 107, to direct the image surface upward. Thereafter, the reversing roller 107 is rotated in the opposite direction, so that the original 3 is discharged onto the sheet discharge tray 201 via the path 111. When the originals 3 corresponding to the final page to the first page are thus discharged onto the sheet discharge tray 201 with the image surfaces 3a directed upward, the originals 3 on the sheet discharge tray 201 are stapled by the stapler 300. Thereafter, the stapled originals 3 are discharged into the containing tray 205 by the feeding roller 204. When the originals 3 are discharged onto the sheet discharge tray 201 in the above-mentioned manner, the left shoulder portions of the image surfaces 3a of the originals 3 are positioned on the side of the main body 1 of the apparatus, and the originals 3 are stapled in the left shoulder portions of the image surfaces 3a.

On the other hand, in forming images on the sheets, the images on the originals 3 corresponding to the final page to the first page are continuously read by the reading system 10, and image data of the respective originals 3 thus read are successively transmitted to an image data processing unit 20. The image data are successively converted into printing data by the image data processing unit 20. Further, the printing data of the originals 3 corresponding to the final page to the first page are successively transmitted from the image data processing unit 20 to a memory unit 30, and are stored in the memory unit 30.

After the originals 3 on the sheet discharge tray 201 are stapled and are discharged into the containing tray 205 as described above, after which the printing data of the originals 3 corresponding to the final page to the first page which are stored in the memory unit 30 are successively transmitted to the image formation processing unit 40. An optical system 60 is driven by the image formation processing unit 40. A toner image is formed on a photosensitive drum 71 by an image forming system 70 as described above. The toner image is transferred to the sheets conveyed by sheet conveying means 80, whereby images based on the images on the originals 3 corresponding to the final page to the first page are successively formed on the sheets.

The sheets respectively having the images formed thereon are successively discharged in descending order of pages from the final page with their image surfaces directed upward onto the sheet discharge tray 201. Thereafter, the sheets respectively having the images formed thereon are stapled by the stapler 300, and are then discharged into the containing tray 205 by the feeding roller 204, similarly to the above-mentioned originals 3. When the sheets respectively having the images formed thereon are discharged onto the sheet discharge tray 201 in the above-mentioned manner, the left shoulder portions of the image surfaces of the sheets are positioned on the side of the main body 1 of the apparatus, and the sheets are stapled in the left shoulder portions of the image surfaces, similarly to the originals 3.

The above-mentioned operations are repeated by a required number of copies, whereby a required number of copies of sheets 4 are respectively stapled in the left shoulder portions of the image surfaces.

(Embodiment 13)

Figure 38:
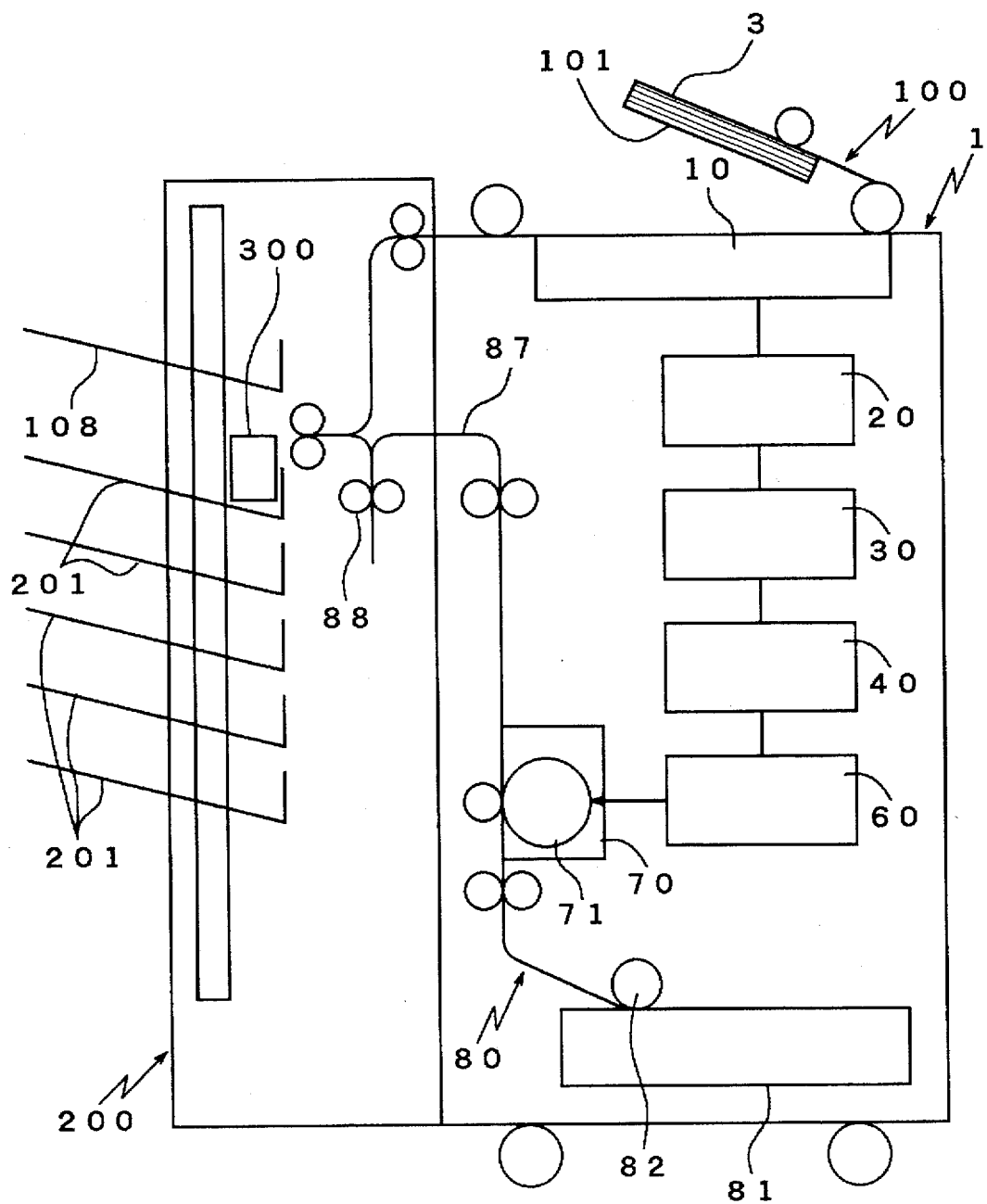
FIG. 38 is a schematic illustration showing an image forming apparatus according to an embodiment 13 of the present invention.

In an image forming apparatus according to the present embodiment, an original discharge tray 108 onto which originals 3 are discharged and sheet discharge trays 201 onto which sheets 4 respectively having images formed thereon are discharged are provided on the right side of a main body 1 of the apparatus, so that the originals 3 are set on an original set tray 101 in such a manner that the original 3 corresponding to the first page is positioned uppermost with their image surfaces 3a directed upward, and a reversing mechanism 88 for turning the sheet having the image formed thereon over is provided in a halfway portion of a conveying path 87 for conveying the sheet, as shown in FIG. 38, as in the image forming apparatus according to the above-mentioned embodiment 3.

In the image forming apparatus according to the present embodiment, the original discharge tray 108 and the sheet discharge trays 201 are so provided as to be movable up and down by a sorter 200, and a stapler 300 is provided in the vicinity of portions where the originals 3 and the sheets respectively having the images formed thereon are discharged.

In the image forming apparatus according to the present embodiment, the originals 3 are successively fed in ascending order of pages from the original 3 corresponding to the first page positioned uppermost with the image surfaces 3a directed upward by an automatic document feeder 100. The original 3 thus fed is turned over, and is led onto a reading system 10 with the image surface 3a directed downward, and an image on the image surface 3a of the original 3 is read by the reading system 10. On the other hand, the original discharge tray 108 is moved to the portion where the original 3 is discharged by the sorter 200.

The originals 3 from which the images have been respectively read in the above-mentioned manner are successively discharged in ascending order of pages from the first page with the image surfaces 3a directed downward onto the original discharge tray 108, and are stacked thereon. When the originals 3 are thus discharged onto the original discharge tray 108, the left shoulder portions of the image surfaces 3a of the originals 3 are positioned on the side of the main body 1 of the apparatus.

On the other hand, image data of the original 3 read by the reading system 10 as described above is transmitted to an image data processing unit 20. The image data is converted into printing data by the image data processing unit 20. The printing data is transmitted from the image data processing unit 20 to a memory unit 30, and is further transmitted from the memory unit 30 to an image formation processing unit 40.

An optical system 60 is driven by the image formation processing unit 40. In an image forming system 70, a toner image is formed on a photosensitive drum 71. The toner image is transferred to the sheets conveyed by sheet conveying means 80, whereby images based on the images on the originals 3 are formed on the sheets.

The sheets respectively having the images formed thereon are successively turned over by the reversing mechanism 88 provided in a halfway portion of the conveying path 87, and are successively led to the sorter 200 with their image surfaces directed downward, and the sheet discharge trays 201 are successively moved by the sorter 200, so that the sheets respectively having the images formed thereon are successively discharged in ascending order of pages from the first page with the image surfaces directed downward onto a predetermined number of sheet discharge trays 201 corresponding to the number of copies. When the sheets respectively having the images formed thereon are thus respectively discharged onto each of the sheet discharge trays 201, the left shoulder portions of the image surfaces of the sheets are positioned on the side of the main body 1 of the apparatus, similarly to the above-mentioned originals 3.

In the image forming apparatus according to the present embodiment, when the originals 3 discharged onto the original discharge tray 108 and the sheets discharged onto the respective sheet discharge trays 201 are stapled as described above, the original discharge tray 108 and the sheet discharge trays 201 are successively led to the position of the stapler 300 by the sorter 200, to successively staple the originals 3 discharged onto the original discharge tray 108 and the sheets discharged onto the respective sheet discharge trays 201. In stapling the originals 3 and the sheets, the originals 3 and the sheets are respectively stapled in the left shoulder portions of the image surfaces by the stapler 300.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

an original set tray on which originals are set;

image reading means for reading an image on at least one of the originals;

image forming means for forming an image on a sheet on the basis of the image on the original read by the image reading means;

an original discharge tray onto which the originals from which the images have been respectively read are discharged;

a plurality of sheet discharge trays onto which the sheets respectively having the images formed thereon are discharged;

an automatic document feeder for leading the originals set on said original set tray to the position of said image reading means one original at a time, and then discharging the original onto the original discharge tray;

distributing means for distributing the sheets respectively having the images formed thereon among the plurality of sheet discharge trays; and a stapler relatively movable in the positions of said original discharge tray and the plurality of sheet discharge trays.

2. The image forming apparatus according to claim 1, further comprising:

conveying means for discharging the originals onto the original discharge tray in such a manner that the images thereon are directed upward by said automatic document feeder, and conveying means for discharging the sheets onto at least one of the plurality of sheet discharge trays in such a manner that the images formed thereon are directed upward.

3. The image forming apparatus according to claim 2, wherein the originals discharged onto the original discharge tray and the sheets discharged onto the sheet discharge tray are so discharged that the images on the originals and the images formed on the sheets are in the same direction by said respective conveying means.

4. The image forming apparatus according to claim 1, further comprising:

conveying means for discharging the originals onto the original discharge tray in such a manner that the images thereon are directed downward by said automatic document feeder, and conveying means for discharging the sheets onto at least one of the plurality of sheet discharge trays in such a manner that the images formed thereon are directed downward.

5. The image forming apparatus according to claim 4, wherein the originals discharged onto the original discharge tray and the sheets discharged onto the sheet discharge tray are so discharged that the images on the originals and the images formed on the sheets are in the same direction by said respective conveying means.

6. The image forming apparatus according to claim 1, wherein the original discharge tray and the plurality of sheet discharge trays are moved with respect to the stapler.

7. The image forming apparatus according to claim 1, wherein the stapler is moved with respect to the original discharge tray and the plurality of sheet discharge trays.

8. The image forming apparatus according to claim 7, further comprising means for making a selection as to whether or not the originals discharged onto said original discharge tray are to be stapled, and controlling means for moving the stapler in the positions of the original discharge tray and the plurality of sheet discharge trays when such a selection is made that the originals are stapled, while moving the stapler in the positions of the plurality of sheet discharge trays when such a selection is made that the originals are not stapled.

9. An image forming apparatus comprising:

an original set tray on which originals are set;

image reading means for reading an image on at least one of the originals;

image forming means for forming an image on a sheet on the basis of the image on the original read by the image reading means;

an original discharge tray onto which the originals from which the images have been respectively read are discharged;

a plurality of sheet discharge trays onto which the sheets respectively having the images formed thereon are discharged;

an automatic document feeder for leading the originals set on said original set tray to the position of said image reading means one original at a time, and then discharging the original onto any one of said original discharge tray and said sheet discharge trays;

switching means for switching the original discharge tray and the sheet discharge trays onto which the originals from which the images have been respectively read are to be discharged;

distributing means for distributing the sheets respectively having the images formed thereon among the plurality of sheet discharge trays; and a stapler relatively moved with respect to the plurality of sheet discharge trays.

10. The image forming apparatus according to claim 9, further comprising:

conveying means for discharging the originals onto at least one of the sheet discharge trays in such a manner that the images thereon are directed downward by said automatic document feeder, and conveying means for discharging the sheets onto at least one of the other plurality of sheet discharge trays in such a manner that the images formed thereon are directed downward.

11. The image forming apparatus according to claim 10, wherein the originals discharged onto the sheet discharge tray and the sheets are so discharged that the images on the originals and the images formed on the sheets are in the same direction by said respective conveying means.

12. The image forming apparatus according to claim 9, further comprising:

conveying means for discharging the originals onto at least one of the plurality of sheet discharge trays in such a manner that the images thereon are directed upward by said automatic document feeder, and conveying means for discharging the sheets onto at least one of the other plurality of sheet discharge trays in such a manner that the images formed thereon are directed upward.

13. The image forming apparatus according to claim 12, wherein the originals discharged onto the sheet discharge tray and the sheets are so discharged that the images on the originals and the images formed on the sheets are in the same direction by said respective conveying means.

14. The image forming apparatus according to claim 9, further comprising:

a guide path for leading, when the originals are discharged onto one of the plurality of sheet discharge trays by said switching means, the originals to the sheet discharge tray positioned in the uppermost stage.

15. The image forming apparatus according to claim 9 wherein the plurality of sheet discharge trays are moved with respect to the stapler.

16. The image forming apparatus according to claim 9, wherein the stapler is moved with respect to the plurality of sheet discharge trays.

17. The image forming apparatus according to claim 16, further comprising:

conveying means for discharging the originals discharged onto at least one of the plurality of sheet discharge trays and the sheets discharged onto at least one of the other plurality of sheet discharge trays that the images on the originals and the images formed on the sheets are in the same direction.

18. An image forming apparatus comprising:

an original set tray on which originals are set;

image reading means for reading an image on at least one of the originals;

image forming means for forming an image on a sheet on the basis of the image on the original read by the image reading means;

an original discharge tray onto which the originals from which the images have been respectively read are discharged;

a sheet discharge tray onto which the sheets respectively having the images formed thereon are discharged;

an automatic document feeder for leading the originals set on said original set tray to the position of said image reading means one original at a time, and then discharging the original onto either one of said original discharge tray and said sheet discharge tray;

switching means for switching the original discharge tray and the sheet discharge tray onto which the originals from which the images have been respectively read are to be discharged; and a stapler for respectively stapling the originals discharged onto the sheet discharge tray and the sheets respectively having the images formed thereon.

* * * * *